United States Patent
Li et al.

(10) Patent No.: US 12,445,182 B2
(45) Date of Patent: Oct. 14, 2025

(54) COMMUNICATION METHOD AND COMMUNICATIONS APPARATUS

(71) Applicant: HUAWEI TECHNOLOGIES CO., LTD., Shenzhen (CN)

(72) Inventors: Xueru Li, Beijing (CN); Mingxin Gong, Beijing (CN); Bingyu Qu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 398 days.

(21) Appl. No.: 18/066,478

(22) Filed: Dec. 15, 2022

(65) Prior Publication Data

US 2023/0128138 A1 Apr. 27, 2023

Related U.S. Application Data

(63) Continuation of application No. PCT/CN2021/099999, filed on Jun. 15, 2021.

(30) Foreign Application Priority Data

Jun. 16, 2020 (CN) .......................... 202010546421.X

(51) Int. Cl.
*H04B 7/06* (2006.01)
(52) U.S. Cl.
CPC .......... *H04B 7/0626* (2013.01); *H04B 7/0632* (2013.01); *H04B 7/0639* (2013.01)

(58) Field of Classification Search
CPC .. H04B 7/0626; H04B 7/0632; H04B 7/0639; H04B 17/309; H04B 17/345;
(Continued)

(56) References Cited

U.S. PATENT DOCUMENTS

2016/0301505 A1 10/2016 Furuskog et al.
2018/0294848 A1* 10/2018 Park ...................... H04L 5/0053
(Continued)

FOREIGN PATENT DOCUMENTS

CN 107204794 A 9/2017
CN 107888264 A 4/2018
(Continued)

OTHER PUBLICATIONS

ZTE et al., "Enhancements to CSI feedback", 3GPP TSG RAN WG1 Meeting #88bis, Spokane, USA, Apr. 3-7, 2017, R1-1704425, 5 pages.

*Primary Examiner* — Candal Elpenord
*Assistant Examiner* — Syed M Bokhari
(74) *Attorney, Agent, or Firm* — Maier & Maier, PLLC

(57) ABSTRACT

A communication method and a communications apparatus: A network device sends first signaling, where the first signaling is used to configure $K_1$ channel state information-reference signal CSI-RS resources; a terminal device receives the first signaling, and reports channel state information CSI; and the network device receives the CSI, where the CSI includes a channel quality indicator CQI of a first codeword, a channel measurement part used to calculate the CQI of the first codeword is determined based on channel measurement results of $K_2$ CSI-RS resources.

16 Claims, 3 Drawing Sheets

(58) Field of Classification Search
CPC ..... H04B 7/0456; H04L 5/0057; H04L 5/005; H04L 5/006; H04L 5/0094; H04L 5/0048; H04W 24/08
USPC ......................................................... 370/329
See application file for complete search history.

(56) References Cited

U.S. PATENT DOCUMENTS

| | | | |
|---|---|---|---|
| 2019/0109690 A1 | 4/2019 | Li et al. | |
| 2019/0132099 A1* | 5/2019 | Wu | H04L 5/0048 |
| 2022/0015064 A1 | 1/2022 | Su et al. | |
| 2023/0136240 A1* | 5/2023 | Zhu | H04L 5/0048 370/329 |

FOREIGN PATENT DOCUMENTS

| | | | |
|---|---|---|---|
| CN | 109151887 A | 1/2019 | |
| CN | 109302272 A | 2/2019 | |
| CN | 109417442 A | 3/2019 | |
| CN | 109842470 A | 6/2019 | |
| CN | 110710124 A | 1/2020 | |
| CN | 110943804 A | 3/2020 | |
| CN | 110943814 A | 3/2020 | |
| CN | 110945793 A | 3/2020 | |
| EP | 2996378 B1 | 1/2019 | |
| WO | 2017076280 A1 | 5/2017 | |
| WO | 2020015757 A1 | 1/2020 | |
| WO | 2020063743 A1 | 4/2020 | |

* cited by examiner

COMMUNICATION METHOD AND COMMUNICATIONS APPARATUS

CROSS-REFERENCE TO RELATED APPLICATIONS

This application is a continuation of International Application No. PCT/CN2021/099999, filed on Jul. 15, 2021, which claims priority to Chinese Patent Application No. 202010546421.X, filed on Jun. 16, 2020. The disclosures of the aforementioned applications are hereby incorporated by reference in their entireties.

TECHNICAL FIELD

The embodiments relate to the communications field, a communication method and a communications apparatus in the communications field.

BACKGROUND

Due to mobility, a terminal device may move from a center of a coverage area of a base station to an edge area of the base station. The edge area is located in a coverage area of a plurality of base stations. Therefore, other signal transmission causes strong interference to the terminal device, and data transmission performance of the terminal device becomes poor. To improve data transmission performance of a terminal device located in an edge area, a coherent joint transmission (CJT) mechanism is introduced in long term evolution (LTE) and new radio (NR).

The CJT mechanism allows a plurality of base stations to transmit data to the terminal device in a coherent transmission mode. The plurality of base stations may mutually know all data information and channel state information (CSI) between the plurality of base stations and the terminal device. Therefore, like a plurality of distributed antenna arrays, the plurality of base stations can jointly precode a same layer of data to be transmitted. The "coherent transmission" means that the plurality of base stations may jointly transmit a data stream, so that signals transmitted by the plurality of base stations can be superimposed in a same direction when the signals arrive at the terminal device, thereby increasing received signal power exponentially and greatly reducing interference. In other words, the coherent transmission may convert all interference between the plurality of base stations into wanted signals, thereby avoiding interference between the base stations, and significantly improving data transmission performance.

To enable the CJT transmission, the terminal device needs to report a correct channel quality indicator (CQI), and a base station determines a modulation coding scheme (MCS) based on the channel quality indicator CQI measured and reported by the terminal device to perform good link adaptation. Therefore, whether the CQI reported by the terminal device can correctly reflect a signal to interference plus noise ratio (SINR) during actual data transmission is critical to data demodulation performance. In an existing CSI reporting framework, all CQIs reported by the terminal device are CQIs based on a single-base-station transmission mechanism or a non-coherent joint transmission (NCJT) mechanism. However, in the single-station transmission mechanism or the NCJT mechanism, signal strength is low, inter-cell interference is relatively high, and CQIs are low. In the CJT transmission mechanism, signal strength is increased, inter-cell interference is reduced, and CQIs are relatively high. Therefore, the CQIs based on the single-station transmission mechanism and the NCJT mechanism cannot accurately reflect the CQIs based on the CJT mechanism, and link adaptation cannot be accurately performed. Consequently, a performance loss is caused.

SUMMARY

The embodiments may provide a communication method and a communications apparatus, to help accurately report a CQI in a joint transmission mechanism, such as a CQI in a CJT mechanism, and improve data transmission performance.

According to a first aspect, a communication method is provided and includes the following steps: A terminal device receives first signaling, where the first signaling is used to configure $K_1$ channel state information-reference signal (CSI-RS) resources; and the terminal device reports channel state information CSI, where the CSI includes a channel quality indicator CQI of a first codeword, a channel measurement part used to calculate the CQI of the first codeword is determined based on channel measurement results of $K_2$ CSI-RS resources, and the $K_2$ CSI-RS resources are resources in the $K_1$ CSI-RS resources, where both $K_1$ and $K_2$ are positive integers, $K_1$ is greater than 1, and $K_2$ is greater than 1 and less than or equal to $K_1$.

In the communication method in this embodiment, the terminal device selects the $K_2$ CSI-RS resources from the $K_1$ CSI-RS resources configured by a network device and performs channel measurements to obtain the CSI. In addition, the channel measurement part of the CQI of the first codeword in the CSI is determined based on the $K_2$ CSI-RS resources together, so that the CSI is reported more accurately. In a possible scenario, the $K_2$ CSI-RS resources may be transmitted by a plurality of different network devices (for example, base stations or transmission and reception nodes (TRP)), that is, the plurality of different network devices provide a CJT mechanism service for the terminal device. The method is used to help accurately report a CQI in a joint transmission mechanism, such as a CQI in a CJT mechanism, and improve data transmission performance.

It should be understood that the channel measurement part and an interference measurement part are required for determining the CQI of the first codeword. The channel measurement part may refer to a signal measurement part other than the interference measurement part, or in other words, refers to a measurement of channel information contributing to a signal rather than interference. The interference herein may be inter-cell interference, inter-user interference, inter-stream interference, or the like. This is not limited herein. That a channel measurement part of the CQI of the first codeword is determined based on channel measurement results of $K_2$ CSI-RS resources may also be known as "the signal measurement part of the CQI of the first codeword is determined based on the channel measurement results of the $K_2$ CSI-RS resources". In other words, based on the $K_2$ CSI-RS resources, the terminal device performs signal (for example, signal power, signal energy, channel strength, or channel energy) measurements and does not perform interference measurements. In this way, the terminal device can perform signal measurements based on a plurality of CSI-RS resources, so that a signal measurement result is determined by the plurality of CSI-RS resources together, that is, signals measured on the plurality of CSI-RS resources all contribute to a final wanted signal.

With reference to the first aspect, in some implementations of the first aspect, that a channel measurement part used to calculate the CQI of the first codeword is determined based on channel measurement results of $K_2$ CSI-RS resources may also be understood as "signal power used to calculate the CQI of the first codeword is determined based on accumulation (accumulation) of channel measurements of the $K_2$ CSI-RS resources". The accumulation herein may be understood as weighted summation (summation).

With reference to the first aspect, in some implementations of the first aspect, the network device may dynamically indicate, in the $K_1$ CSI-RS resources that are semi-statically configured, the $K_2$ CSI-RS resources used by the terminal device to perform CSI measurements.

With reference to the first aspect, in some implementations of the first aspect, the CQI of the first codeword is determined conditionally based on a precoding matrix indicator (precoding matrix indicator, PMI), and a quantity of rows of a precoding matrix indicated by the PMI is equal to a sum of all or some port quantities of the $K_2$ CSI-RS resources.

In other words, the CQI of the first codeword is obtained through calculation based on channel measurement results of ports of the $K_2$ CSI-RS resources. The CQI of the first codeword may be determined based on channel measurement results of all or some ports of each of the $K_2$ CSI-RS resources.

Optionally, if the quantity of rows of the precoding matrix indicated by the PMI is equal to the sum of some port quantities of the $K_2$ CSI-RS resources, the terminal device may report some selected ports to the network device, or the network device configures some selected ports for the terminal device, or the network device and the terminal device may select some ports according to a predefined rule.

Optionally, the PMI may be reported by the terminal device. For example, the CSI includes the PMI. Alternatively, the PMI may be determined by the network device. For example, the CSI reporting mode is a non-PMI reporting mode.

Optionally, the $K_2$ CSI-RS resources may be non-beamformed CSI-RS resources or may be beamformed CSI-RS resources. A precoding matrix indicated by a PMI measured and reported for a non-beamformed CSI-RS may be selected from a type I or type II (Type I/II) codebook, or selected from a multi-panel codebook, or selected from a multi-station CJT transmission codebook. This is not limited in this embodiment.

With reference to the first aspect, in some implementations of the first aspect, the CSI is determined based on a channel measurement result of a $k^{th}$ CSI-RS resource in the $K_2$ CSI-RS resources and a $k^{th}$ first parameter, where the $k^{th}$ first parameter is determined based on a matrix part corresponding to a port of the $k^{th}$ CSI-RS resource in the precoding matrix and a reference precoding matrix.

Optionally, the $k^{th}$ first parameter is determined based on energy (or power) of a matrix part corresponding to a port of the $k^{th}$ CSI-RS resource in the precoding matrix and energy (or power) of a reference precoding matrix.

Optionally, the $k^{th}$ first parameter is determined based on a difference or ratio between energy (or power) of a matrix part corresponding to a port of the $k^{th}$ CSI-RS resource in the precoding matrix and energy (or power) of a reference precoding matrix.

In other words, the CSI may be determined based on a channel measurement result of one CSI-RS resource (that is, the $k^{th}$ CSI-RS resource) in the $K_2$ CSI-RS resources and a first parameter corresponding to the CSI-RS resource. Further, the CSI may be determined based on a channel measurement result of each of the $K_2$ CSI-RS resources and a first parameter corresponding to the CSI-RS resource. In this case, $k=1, 2, \ldots, K_2$.

Optionally, the reference precoding matrix is a matrix part corresponding to a port of one of the $K_1$ CSI-RS resources in the precoding matrix. Optionally, the reference precoding matrix is a matrix part corresponding to a port of one of the $K_2$ CSI-RS resources in the precoding matrix. Optionally, an identifier of a CSI-RS resource corresponding to the reference precoding matrix is reported by the terminal device to the network device.

With reference to the first aspect, in some implementations of the first aspect, the $k^{th}$ first parameter is determined based on energy per resource element (EPRE) of a first physical downlink shared channel (PDSCH) transmitted by a network device corresponding to the $k^{th}$ CSI-RS resource, and reference EPRE. In a possible implementation, the reference EPRE may be EPRE of the first PDSCH transmitted by a network device corresponding to one of the $K_1$ (or $K_2$) CSI-RS resources. In another possible implementation, the reference EPRE is EPRE of a second PDSCH transmitted by using a non-CJT mechanism.

It should be understood that the first parameter can be defined to reflect that when different network devices transmit a same PDSCH (for example, the first PDSCH) by using the CJT transmission mechanism, the different network devices may allocate different power to meet a data requirement of a network (for example, increasing a data throughput, improving fairness, or reducing energy consumption). The first parameter may be further defined based on an existing definition of a ratio of PDSCH EPRE to CSI-RS EPRE. This helps configure a same CSI-RS resource for a plurality of terminal devices and helps prevent the network device from separately configuring different CSI-RS resources for a non-CJT transmission terminal device and a CJT transmission terminal device, thereby reducing CSI-RS resource overheads of the network device.

With reference to the first aspect, in some implementations of the first aspect, that the CSI is determined based on a channel measurement result of a $k^{th}$ CSI-RS resource in the $K_2$ CSI-RS resources and a $k^{th}$ first parameter may also be understood as "the signal power used to calculate the CQI of the first codeword in the CSI is determined based on accumulation of the channel measurements of the $K_2$ CSI-RS resources". Optionally, a weighting coefficient in accumulation is determined based on $K_2$ first parameters.

With reference to the first aspect, in some implementations of the first aspect, the CSI is determined based on the following information: the channel measurement result of the $k^{th}$ CSI-RS resource, the $k^{th}$ first parameter, and a second parameter of the $k^{th}$ CSI-RS resource, where the second parameter of the $k^{th}$ CSI-RS resource is determined based on a physical downlink shared channel PDSCH and the $k^{th}$ CSI-RS resource.

Optionally, the second parameter of the $k^{th}$ CSI-RS resource is determined based on energy per resource element (EPRE) of the physical downlink shared channel PDSCH and EPRE of the $k^{th}$ CSI-RS resource.

With reference to the first aspect, in some implementations of the first aspect, the first parameter is configured by the network device for the terminal device by using second signaling; or the first parameter is reported by the terminal device, and the CSI includes the first parameter.

Optionally, the $k^{th}$ first parameter may include one first parameter, or may include a plurality of first parameters.

Optionally, a first parameter of the $k^{th}$ CSI-RS resource may be indicated by the network device or reported by the terminal device.

For example, if the first parameter of the $k^{th}$ CSI-RS resource is indicated by the network device, the network device may configure one first parameter for all ports of the $k^{th}$ CSI-RS resource. Alternatively, the network device may configure one first parameter for each group of ports of the $k^{th}$ CSI-RS resource, where each group of ports includes at least one port. Alternatively, the network device may configure one first parameter for each column group of a matrix part corresponding to a port of the $k^{th}$ CSI-RS resource in the precoding matrix, where each column group includes at least one column.

For example, if the first parameter of the $k^{th}$ CSI-RS resource is reported by the terminal device, the terminal device may report one first parameter for all ports of the $k^{th}$ CSI-RS resource. Alternatively, the terminal device may report one first parameter for each group of ports of the $k^{th}$ CSI-RS resource, where each group of ports includes at least one port. Alternatively, the terminal device may report one first parameter for each column group of a matrix part corresponding to a port of the $k^{th}$ CSI-RS resource in the precoding matrix, where each column group includes at least one column.

With reference to the first aspect, in some implementations of the first aspect, the CSI is determined based on a first transmission mechanism, a channel measurement result of a $k^{th}$ CSI-RS resource in the $K_2$ CSI-RS resources, and a third parameter of the $k^{th}$ CSI-RS resource; and the method further includes: the terminal device receives third signaling, where the third signaling is used to configure the third parameter of the $k^{th}$ CSI-RS resource in the $K_2$ CSI-RS resources, and the third parameter is determined based on EPRE of a PDSCH and EPRE of the $k^{th}$ CSI-RS resource in the first transmission mechanism; and the terminal device receives fourth signaling, where the fourth signaling is used to configure a fourth parameter of the $k^{th}$ CSI-RS resource, and the fourth parameter is determined based on EPRE of a PDSCH and EPRE of the $k^{th}$ CSI-RS resource in a second transmission mechanism.

In other words, the CSI may be determined based on a channel measurement result of one CSI-RS resource (that is, the $k^{th}$ CSI-RS resource) in the $K_2$ CSI-RS resources and a third parameter corresponding to the CSI-RS resource. Further, the CSI may be determined based on a channel measurement result of each of the $K_2$ CSI-RS resources and a third parameter corresponding to the CSI-RS resource. In this case, $k=1, 2, \ldots, K_2$.

In this embodiment, the network device configures parameters in different transmission mechanisms for the terminal device, where the first transmission mechanism corresponds to the third parameter, and the second transmission mechanism corresponds to the fourth parameter; and the terminal device may flexibly select a corresponding parameter based on a current transmission mechanism to calculate the CQI. The first transmission mechanism may be the CJT mechanism, and the second transmission mechanism may be a single-station transmission mechanism or an NCJT mechanism.

Optionally, the third parameter is determined based on the EPRE of the PDSCH and the EPRE of the $k^{th}$ CSI-RS resource in the first transmission mechanism. The fourth parameter is determined based on the EPRE of the PDSCH and the EPRE of the $k^{th}$ CSI-RS resource in the second transmission mechanism.

Optionally, the third parameter is a difference or ratio between the EPRE of the PDSCH and the EPRE of the $k^{th}$ CSI-RS resource in the first transmission mechanism. The fourth parameter is a difference or ratio between the EPRE of the PDSCH and the EPRE of the $k^{th}$ CSI-RS resource in the second transmission mechanism.

With reference to the first aspect, in some implementations of the first aspect, an interference measurement part of the CQI of the first codeword is determined based on interference measurement results of $K_3$ interference measurement resources IMRs, where $K_3$ is a positive integer.

In this embodiment, the $K_3$ IMRs are used to measure interference outside a candidate coordination set. The candidate coordination set may also be referred to as a coordination set. The candidate coordination set includes a plurality of network devices, and the plurality of network devices are network devices that serve the terminal device by using the CJT mechanism. Therefore, the interference outside the candidate coordination set is interference caused to the terminal device by a network device other than a plurality of network devices that transmit a PDSCH to the terminal device by using the CJT mechanism.

The $K_3$ interference measurement resources IMRs may be configured by the network device for the terminal device by using signaling. Optionally, the network device may configure the $K_3$ IMRs by using the first signaling.

With reference to the first aspect, in some implementations of the first aspect, the interference measurement part of the CQI of the first codeword is determined based on measurement results of $K_4$ CSI-RS resources other than the $K_2$ CSI-RS resources in the $K_1$ CSI-RS resources, where $K_4$ is less than or equal to a difference between $K_1$ and $K_2$, the interference measurement part is determined based on summation of interference information measured on the $K_4$ CSI-RS resources, and interference information measured on a $j^{th}$ CSI-RS resource in the $K_4$ CSI-RS resources is determined based on an interference measurement result of the $j^{th}$ CSI-RS resource.

In other words, the interference measurement part may be determined based on an interference measurement result of one CSI-RS resource (that is, the $j^{th}$ CSI-RS resource) in the $K_4$ CSI-RS resources. Further, the interference measurement part may be determined based on an interference measurement result of each of the $K_4$ CSI-RS resources. In this case, $j=1, 2, \ldots, K_4$.

Optionally, an interference measurement on the $j^{th}$ CSI-RS resource is determined based on an interference channel measured on the resource. Optionally, that the interference measurement part is determined based on summation (or accumulation) of interference information measured on the $K_4$ CSI-RS resources may be understood as "interference power or interference energy is determined based on interference channels measured on the $K_4$ CSI-RS resources and $K_4$ first parameters". Definitions of the first parameters are the same as the foregoing and are not described again. Alternatively, that the interference measurement part is determined based on summation (or accumulation) of interference information measured on the $K_4$ CSI-RS resources may be understood as "interference power or interference energy is determined based on interference channels measured on the $K_4$ CSI-RS resources and $K_4$ third parameters". Definitions of the third parameters are the same as the foregoing and are not described again.

With reference to the first aspect, in some implementations of the first aspect, a first quasi-co-location QCL-type D parameter and a second QCL-type D parameter are configured for one of the $K_2$ CSI-RS resources; the first QCL-type D parameter is associated with a first reference signal, and the second QCL-type D parameter is associated with a second reference signal; and the first reference signal is used to indicate the terminal device to receive a receive beam of the CSI-RS in the first transmission mechanism, and the second reference signal is used to indicate the terminal device to receive a receive beam of the CSI-RS in the second transmission mechanism; or the first reference signal and the second reference signal are used to indicate the terminal device to receive a receive beam of the CSI-RS in the first transmission mechanism.

It should be understood that the two quasi-co-location (QCL-type D) parameters are merely examples for description. In this embodiment, a plurality of sets of parameters may be configured for one CSI-RS resource. For example, two QCL-type D parameters including the first QCL-type D parameter and the second QCL-type D parameter may be configured for one CSI-RS resource. Different transmission mechanisms may correspond to different QCL-type D parameters. Because the QCL-type D parameters are associated with reference signals, different reference signals may be used for different transmission mechanisms. The receive beam may also be referred to as a receive filter or a spatial domain receive filter. This is not limited in this embodiment.

In this embodiment, a plurality of sets of parameters are configured for one CSI-RS resource, so that in a scenario in which one network device serves a plurality of terminals by using both the single-station transmission mechanism and the CJT mechanism, there is no need to configure a plurality of sets of CSI-RS resources. This makes CSI-RS resource reuse in each cell more flexible and helps reduce overheads of configured CSI-RS resources and improve utilization of the CSI-RS resources.

With reference to the first aspect, in some implementations of the first aspect, the method further includes: the terminal device transmits first indication information, where the first indication information is used to indicate data transmission mechanisms, and the data transmission mechanisms include a first transmission mechanism and a second transmission mechanism; or the terminal device receives first indication information from the network device.

With reference to the first aspect, in some implementations of the first aspect, the method further includes: the terminal device transmits second indication information, where the second indication information is used to indicate the $K_2$ CSI-RS resources; or the terminal device receives second indication information from the network device.

According to a second aspect, another communication method is provided and includes the following steps: A network device transmits first signaling to a terminal device, where the first signaling is used to configure $K_1$ channel state information-reference signal CSI-RS resources; and the network device receives channel state information CSI from the terminal device, where the CSI includes a channel quality indicator CQI of a first codeword, a channel measurement part used to calculate the CQI of the first codeword is determined based on channel measurement results of $K_2$ CSI-RS resources, and the $K_2$ CSI-RS resources are resources in the $K_1$ CSI-RS resources, where both $K_1$ and $K_2$ are positive integers, $K_1$ is greater than 1, and $K_2$ is greater than 1 and less than or equal to $K_1$.

With reference to the second aspect, in some implementations of the second aspect, the CQI of the first codeword is determined conditionally based on a precoding matrix indicator PMI, and a quantity of rows of a precoding matrix indicated by the PMI is equal to a sum of all or some port quantities of the $K_2$ CSI-RS resources.

With reference to the second aspect, in some implementations of the second aspect, the CSI is determined based on a channel measurement result of a $k^{th}$ CSI-RS resource in the $K_2$ CSI-RS resources and a $k^{th}$ first parameter, where the $k^{th}$ first parameter is determined based on a matrix part corresponding to a port of the $k^{th}$ CSI-RS resource in the precoding matrix and a reference precoding matrix, k=1, 2, . . . , $K_2$, and the reference precoding matrix is a matrix part corresponding to a port of one of the $K_1$ CSI-RS resources in the precoding matrix.

With reference to the second aspect, in some implementations of the second aspect, the CSI is determined based on the following information: the channel measurement result of the $k^{th}$ CSI-RS resource, the $k^{th}$ first parameter, and a second parameter of the $k^{th}$ CSI-RS resource, where the second parameter of the $k^{th}$ CSI-RS resource is determined based on a physical downlink shared channel PDSCH and the $k^{th}$ CSI-RS resource.

With reference to the second aspect, in some implementations of the second aspect, the first parameter is configured by the network device for the terminal device by using second signaling; or the first parameter is reported by the terminal device, and the CSI includes the first parameter.

With reference to the second aspect, in some implementations of the second aspect, the CSI is determined based on a first transmission mechanism, a channel measurement result of a $k^{th}$ CSI-RS resource in the $K_2$ CSI-RS resources, and a third parameter of the $k^{th}$ CSI-RS resource; and the method further includes: the network device transmits third signaling to the terminal device, where the third signaling is used to configure the third parameter of the $k^{th}$ CSI-RS resource in the $K_2$ CSI-RS resources, and the third parameter is determined based on EPRE of a PDSCH and EPRE of the $k^{th}$ CSI-RS resource in the first transmission mechanism; and the network device transmits fourth signaling to the terminal device, where the fourth signaling is used to configure a fourth parameter of the $k^{th}$ CSI-RS resource, and the fourth parameter is determined based on EPRE of a PDSCH and EPRE of the $k^{th}$ CSI-RS resource in a second transmission mechanism.

With reference to the second aspect, in some implementations of the second aspect, an interference measurement part of the CQI of the first codeword is determined based on interference measurement results of $K_3$ interference measurement resources IMRs, where $K_3$ is a positive integer.

With reference to the second aspect, in some implementations of the second aspect, the interference measurement part of the CQI of the first codeword is determined based on measurement results of $K_4$ CSI-RS resources other than the $K_2$ CSI-RS resources in the $K_1$ CSI-RS resources, where $K_4$ is less than or equal to a difference between $K_1$ and $K_2$, the interference measurement part is determined based on summation of interference information measured on the $K_4$ CSI-RS resources, interference information measured on a $j^{th}$ CSI-RS resource in the $K_4$ CSI-RS resources is determined based on an interference measurement result of the $j^{th}$ CSI-RS resource, and j=1, 2, . . . , $K_4$.

With reference to the second aspect, in some implementations of the second aspect, a first quasi-co-location QCL-type D parameter and a second QCL-type D parameter are configured for one of the $K_2$ CSI-RS resources; the first QCL-type D parameter is associated with a first reference signal, and the second QCL-type D parameter is associated with a second reference signal; and the first reference signal is used to indicate the terminal device to receive a receive beam of the CSI-RS in the first transmission mechanism, and the second reference signal is used to indicate the terminal device to receive a receive beam of the CSI-RS in the second transmission mechanism; or the first reference signal and the second reference signal are used to indicate the terminal device to receive a receive beam of the CSI-RS in the first transmission mechanism.

With reference to the second aspect, in some implementations of the second aspect, the method further includes: the network device transmits first indication information to the terminal device, where the first indication information is used to indicate data transmission mechanisms, and the data transmission mechanisms include a first transmission mechanism and a second transmission mechanism; or the network device receives first indication information from the terminal device.

With reference to the second aspect, in some implementations of the second aspect, the method further includes: the network device transmits second indication information to the terminal device, where the second indication information is used to indicate the $K_2$ CSI-RS resources; or the network device receives second indication information from the terminal device.

According to a third aspect, a communications apparatus is provided and configured to perform the method in any one of the possible implementations of the foregoing aspects. The apparatus may include units configured to perform the method in any one of the possible implementations of the foregoing aspects.

According to a fourth aspect, a communications apparatus is provided and includes a processor, where the processor is coupled to a memory and may be configured to execute instructions in the memory to implement the method in any one of the possible implementations of the foregoing aspects. Optionally, the apparatus may further include the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip configured in a terminal device. When the communications apparatus is the chip configured in the terminal device, the communications interface may be an input/output interface.

In an implementation, the communications apparatus is a network device. When the communications apparatus is the network device, the communications interface may be a transceiver or an input/output interface.

In another implementation, the communications apparatus is a chip configured in a network device. When the communications apparatus is the chip configured in the network device, the communications interface may be an input/output interface.

According to a fifth aspect, a processor is provided and includes an input circuit, an output circuit, and a processing circuit. The processing circuit is configured to receive a signal by using the input circuit, and transmit a signal by using the output circuit, so that the processor performs the method in any one of the possible implementations of the foregoing aspects.

In an implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Implementations of the processor and the circuits are not limited in embodiments.

According to a sixth aspect, a processing apparatus is provided and includes a processor and a memory. The processor is configured to read instructions stored in the memory, and can receive a signal by using a receiver, and transmit a signal by using a transmitter, to perform the method in any one of the possible implementations of the foregoing aspects.

Optionally, one or more processors exist, and one or more memories exist.

Optionally, the memory may be integrated with the processor, or the memory and the processor are separately disposed.

In an implementation process, the memory may be a non-transitory memory, for example, a read-only memory (ROM). The memory and the processor may be integrated into a same chip or may be disposed on different chips. A type of the memory and a manner in which the memory and the processor are disposed are not limited in this embodiment.

It should be understood that, a related data exchange process such as sending of indication information may be a process of outputting the indication information from the processor, and receiving of capability information may be a process of receiving the input capability information by the processor. Data output by the processor may be output to a transmitter, and input data received by the processor may be from a receiver. The transmitter and the receiver may be collectively referred to as a transceiver.

It should be understood that the processing apparatus in the sixth aspect may be a chip. The processor may be implemented by hardware or may be implemented by software. When the processor is implemented by the hardware, the processor may be a logic circuit, an integrated circuit, or the like. When the processor is implemented by the software, the processor may be a general-purpose processor. The general-purpose processor is implemented by reading software code stored in the memory. The memory may be integrated into the processor or may be located outside the processor and exist independently.

According to a seventh aspect, a computer program product is provided. The computer program product includes a computer program (which may also be referred to as code or an instruction). When the computer program is run, a computer is enabled to perform the method in any one of the possible implementations of the foregoing aspects.

According to an eighth aspect, a non-transitory computer-readable storage medium is provided. The non-transitory computer-readable storage medium stores a computer program (which may also be referred to as code or an instruction). When the computer program is run on a computer, the computer is enabled to perform the method in any one of the possible implementations of the foregoing aspects.

According to a ninth aspect, a communications system is provided and includes the foregoing terminal device and network device.

DETAILED DESCRIPTION OF THE EMBODIMENTS

The following describes the embodiments with reference to the accompanying drawings.

The embodiments may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

The embodiments may be further applied to various communications systems based on non-orthogonal multiple access technologies, for example, a sparse code multiple access (SCMA) system. Additionally, SCMA may also be referred to as another name in the communications field. Further, the embodiments may be applied to multi-carrier transmission systems using the non-orthogonal multiple access technologies, for example, orthogonal frequency division multiplexing (OFDM), filter bank multi-carrier (FBMC), generalized frequency division multiplexing (GFDM), and filtered orthogonal frequency division multiplexing (F-OFDM) systems using the non-orthogonal multiple access technologies.

Figure 1:
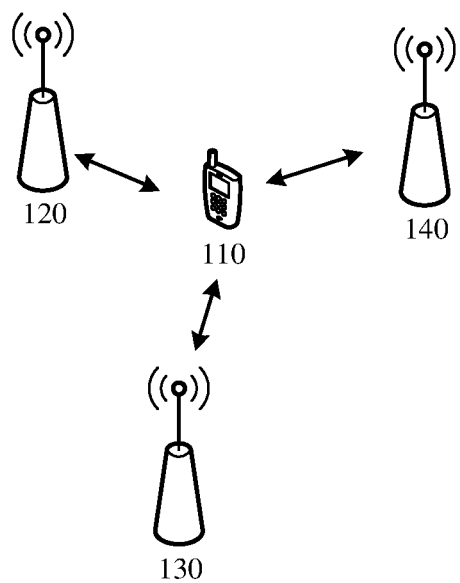
FIG. 1 is a schematic diagram of a communications system according to an embodiment.

For ease of understanding the embodiments, a communications system to which the embodiments are applicable is first described in detail with reference to FIG. 1. FIG. 1 is a schematic diagram of the communications system to which the embodiments are applicable. As shown in FIG. 1, the communications system 100 may include a terminal device 110, a network device 120, a network device 130, and a network device 140. The network devices 120 to 140 may communicate with the terminal device 110 by using radio links. Any one of the following transmission mechanisms may be used between the network devices and the terminal device: single-station transmission, coherent joint transmission (CJT), and non-coherent joint transmission (NCJT).

A plurality of antennas may be configured for each communications device, such as the network devices 120 to 140 or the terminal device 110. The plurality of antennas may include at least one transmit antenna configured to transmit a signal and at least one receive antenna configured to receive a signal. In addition, each communications device additionally further includes a transmitter chain and a receiver chain. A person of ordinary skill in the art may understand that each communications device may include a plurality of components related to signal transmission and reception (for example, a processor, a modulator, a multiplexer, a demodulator, a demultiplexer, and an antenna). Therefore, the network devices 120 to 140 may communicate with the terminal device 110 by using a multi-antenna technology.

The terminal device in the embodiments may communicate with one or more core networks by using a radio access network (RAN), and the terminal device may be referred to as an access terminal, user equipment (UE), a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like.

The network device in the embodiments may be a device configured to communicate with the terminal device. The network device may be a base station (BTS) in a global system for mobile communications (GSM) or code division multiple access (CDMA), or may be a base station (NB) in a wideband code division multiple access (WCDMA) system, or may be an evolved base station (eNB) in an LTE system, or may be a radio controller in a cloud radio access network (CRAN) scenario. Alternatively, the network device may be a relay station, an access point, a vehicle-mounted device, a roadside station, a wearable device, a network device in a future 5G network, a network device in a future evolved PLMN network, or the like. This is not limited in the embodiments. For example, the network device is a gNB in an NR system, a transmission and reception node or transmission point (TP), or one antenna panel or a group of antenna panels (including a plurality of antenna panels) of a base station in a 5G system, or may be a network node that constitutes a gNB or a transmission point, such as a baseband unit (BBU) or a distributed unit (DU).

In some deployments, the gNB may include a central unit (CU) and the DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer; and the DU implements functions of a radio link control (RLC) layer, a media access control (MAC) layer, and a physical (PHY) layer. Information at the RRC layer eventually becomes information at the PHY layer or is converted from the information at the PHY layer. Therefore, in the architecture, higher layer signaling such as RRC layer signaling may also be considered as being sent by the DU or sent by the DU and the CU. It may be understood that the network device may be a CU node, a DU node, or a device including a CU node and a DU node. In addition, the CU may be classified into a network device in an access network (RAN), or the CU may be classified into a network device in a core network (CN). This is not limited.

In the embodiments, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a structure of an execution body of a method provided in the embodiments is not limited in the embodiments, provided that a program that records code of the method provided in the embodiments can be run to perform communication according to the method provided in the embodiments. For example, the method provided in the embodiments may be performed by the terminal device or the network device, or a functional module that can invoke and execute the program in the terminal device or the network device.

In addition, aspects or features may be implemented as a method, an apparatus, or a product that uses standard programming and/or engineering technologies. The term "product" covers a computer program that can be accessed from any computer-readable component, carrier, or medium. For example, the non-transitory computer-readable medium may include, but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described may indicate one or more devices and/or other machine-readable media that are configured to store information. The term "machine-readable media" may include various other non-transitory media that can store, include, and/or carry instructions and/or data.

The embodiments may be applicable to an LTE system, the Internet of Vehicles, a later evolved system such as 5G, or other wireless communications systems using various radio access technologies, for example, systems using access technologies such as code division multiple access, frequency division multiple access, time division multiple access, orthogonal frequency division multiple access, and single carrier frequency division multiple access, and particularly applicable to a scenario in which channel information feedback is required and/or a two-level precoding technology is applied, for example, a wireless network using a massive MIMO technology or a wireless network using a distributed antenna technology.

It should be understood that a multiple-input multiple-output (MIMO) technology means that a transmit end device and a receive end device respectively use a plurality of transmit antennas and a plurality of receive antennas, so that signals are transmitted and received by using the plurality of antennas of the transmit end device and the plurality of antennas of the receive end device, thereby improving quality of communication. The MIMO technology can fully use spatial resources and achieve multiple transmission and multiple reception by using a plurality of antennas and can increase a channel capacity of the system exponentially without increasing spectrum resources and antenna transmit power.

For ease of understanding, the following first describes related terms in the embodiments.

Current transmission mechanisms may be classified into two types: single-station transmission and multi-station joint transmission. The multi-station joint transmission further includes a plurality of transmission mechanisms, for example, coherent joint transmission (CJT), non-coherent joint transmission (NCJT), and dynamic transmission point selection (DPS).

1. Single-Station Transmission

Single-station transmission means that each terminal device is served by only one network device. When the terminal device moves to a service range of another network device, cell handover needs to be performed.

In a CSI reporting framework of the single-station transmission mechanism, one CSI configuration (CSI report config) may be used to configure a set of channel measurement resources (CMR) and a set of interference measurement resources (IMR). A set of CMRs may be a CMR set including a plurality of non zero power (NZP) CSI-RS resources, and the plurality of NZP CSI-RS resources correspond to a plurality of CSI-RS beams of a TRP. Different beams may correspond to different directions in a cell. When reporting CSI, the terminal device may select one CMR to perform a measurement and calculate and report the CSI. The CSI may include at least one of a CSI-RS resource indicator (CRI), a rank indicator (RI), a precoding matrix indicator (PMI), and a channel quality indicator (CQI).

2. Non-Coherent Joint Transmission NCJT

In a non-coherent transmission mechanism, each serving network device transmits different data streams for the terminal device. A precoding matrix of each data stream may be independently determined based on CSI between a corresponding serving network device to the terminal device or determined based on CSI from all serving network devices and the terminal device together. An advantage of using this transmission mechanism lies in that data transmission of more streams can be provided for the terminal device and that user experience of the terminal device at a cell edge is improved. In addition, network devices do not need to dynamically exchange information (such as CSI information or scheduling information), thereby avoiding an interaction delay. This is more applicable to a scenario in which network devices are interconnected by using a non-ideal backhaul. However, because the network devices transmit different layers of data respectively, there is interference between the layers of data, referred to as "inter-stream interference", and data transmission performance is limited to some extent.

In a CSI reporting framework of the NCJT mechanism, one CSI configuration (CSI report config) may be used to configure a plurality of sets of CMRs and one set of IMRs, and the plurality of sets of CMRs may correspond to reference signals transmitted by a plurality of TRPs. When reporting CSI, the terminal device may report one CRI used to select J TRPs, where J is a positive integer and is less than or equal to a total quantity of TRPs, and the terminal device reports J pieces of CSI (each of which may include at least one of an RI, a PMI, and a CQI). In the NCJT mechanism, for CSI calculation, it needs to be assumed that inter-stream interference occurs between data streams transmitted by different TRPs, so that channel quality can be correctly reflected.

3. Coherent Joint Transmission CJT

The CJT allows a plurality of network devices to transmit data to the terminal device in a coherent transmission mode. A plurality of network devices serving the terminal device all know data information to be transmitted to the terminal device, and each network device needs to know CSI between the network device and other network devices and the terminal device. Therefore, like a plurality of distributed antenna arrays, the plurality of network devices can jointly precode a same layer of data to be transmitted and are equivalent to a large network device. The "coherent transmission" means that the plurality of network devices may jointly transmit a data stream, so that signals transmitted by the plurality of network devices can be superimposed in a same direction when the signals arrive at the terminal device, thereby increasing received signal power exponentially and greatly reducing interference. In other words, the coherent transmission may convert interference between the plurality of network devices into wanted signals, thereby significantly improving data transmission performance. Using FIG. 1 as an example, in the CJT mechanism, the network device 120, the network device 130, and the network device 140 provide CJT for the terminal device 110. In this case, among signals received by the terminal device 110, wanted signals come from all the three network devices. However, in the single-station transmission or NCJT mechanism, only one serving network device can provide wanted signals, and other network devices cause interference to the serving network device. Therefore, the CJT mechanism can significantly improve a signal to interference plus noise ratio (SINR).

To enable the CJT transmission, the terminal device needs to report a correct channel quality indicator (CQI), and a network device determines a modulation coding scheme (MCS) based on the channel quality indicator CQI measured and reported by the terminal device to perform good link adaptation. Therefore, whether the CQI reported by the terminal device can correctly reflect an SINR during actual data transmission is critical to data demodulation performance. The terminal device may receive a channel state information-reference signal (CSI-RS) transmitted by the network device, measure a channel on a CMR resource, and measure interference on an IMR resource, to calculate a CQI and report the CQI to the network device. A reference signal resource used to measure a channel is referred to as a CMR resource, and a reference signal resource used to measure interference is referred to as an IMR resource. However, the foregoing resource may also use another name, for example, a CSI-RS resource or a CSI-IM resource. This is not limited in the embodiments. In addition, the CMR resource may be a non zero power (NZP) reference signal resource, and the IMR resource may be a zero power (ZP) reference signal resource or an NZP reference signal resource. Further, the network device may determine the MCS based on the CQI and indicate the MCS to the terminal device.

In the existing CSI reporting framework, all CQIs reported by the terminal device are CQIs based on the single network device transmission mechanism or the NCJT mechanism. However, in the single-station transmission mechanism or the NCJT mechanism, signals are transmitted by one network device, and other network devices cause inter-cell interference and inter-stream interference. In the CJT transmission mechanism, signals come from a plurality of network devices. In comparison with single-station transmission, signal strength is increased and inter-cell interference is reduced. Therefore, generally, the CQI in the CJT transmission mechanism is higher than CQIs in the single-station transmission mechanism and the NCJT transmission mechanism. Therefore, the CQIs based on the single-station transmission mechanism and the NCJT mechanism cannot accurately reflect the CQIs based on the CJT mechanism, and link adaptation cannot be accurately performed. Consequently, a performance loss is caused.

Currently, an existing solution is to perform a CSI-RS configuration based on an implementation behavior of a network device and enable a terminal device to perform a CQI measurement based on the CJT mechanism. The method may not require a protocol change. CSI-RSs transmitted by a plurality of network devices may be combined into one CSI-RS used to measure a channel in the CJT mechanism. Using three network devices as an example, the three network devices participate in CJT transmission. Each network device separately transmits a 4-port CSI-RS, and the 4-port CSI-RSs may be combined into a 12-port CSI-RS. Therefore, in a CSI configuration (CSI report config) configured by the network device for the terminal device by using signaling, a CMR set includes one CSI-RS resource, and the resource has 12 ports. The 12 ports are from three TRPs. However, this is transparent to the terminal device. To reflect a CQI in the CJT mechanism, the terminal device only needs to measure the CSI-RS on the CSI-RS resource and calculate the CQI. Therefore, in the existing CSI reporting method, the terminal device performs a channel measurement based on one CSI-RS resource.

In the current protocol, only one set of parameters is configured for one CSI-RS resource. For example, only one quasi-co-location (QCL-type D) parameter can be configured for one CSI-RS resource. This means that in the foregoing method, parameters used by the three 4-port CSI-RSs of the three TRPs must be the same. This is disadvantageous to multiplexing of the three 4-port CSI-RSs to another terminal device in each cell to perform measurements and causes a sharp increase in CSI-RS overheads of the entire network.

For example, the plurality of network devices may include a TRP 1 and a TRP 2. The TRP 1 serves UE 1 and UE 2, and the TRP 2 serves the UE 2 and UE 3. The UE 1 is a terminal served by the TRP 1 by using the single network device transmission mechanism, the UE 3 is a terminal served by the TRP 2 by using the single network device transmission mechanism, and the UE 2 is a terminal served by the TRP 1 and the TRP 2 together by using the CJT mechanism. To enable the UE 2 to perform a CQI measurement in the CJT mechanism, according to the foregoing method, the TRP 1 and the TRP 2 respectively transmit a 4-port CSI-RS to form an 8-port CSI-RS, where the CSI-RS uses a parameter set a. To enable the UE 1 to perform a CQI measurement in the single network device transmission mechanism, the TRP 1 further needs to transmit, to the UE 1, an additional 4-port CSI-RS using a parameter set b. Similarly, the TPR 2 further needs to transmit, to the UE 3, an additional 4-port CSI-RS using a parameter set c. It can be understood that CSI-RS overheads of the TRP 1 and the TRP 2 are both two CSI-RS resources. However, in a non-joint transmission scenario, assuming that both the UE 1 and the UE 2 are served by the TRP 1, the TRP 1 needs to transmit only one 4-port CSI-RS using the parameter set b, and the UE 1 and the UE 2 can perform joint measurements. Therefore, using the foregoing solution increases overheads of CSI-RS resources configured on the network device side in the CJT mechanism, and reduces time-frequency resource utilization of the entire network.

In view of this, the embodiments may provide a communication method and a communications apparatus, to help accurately report a CQI in the CJT mechanism and improve data transmission performance. In addition, in the foregoing scenario, that is, in a scenario in which one TRP uses both the single-station transmission mechanism and the CJT mechanism to serve a plurality of terminals, there is no need to configure a plurality of sets of CSI-RS resources. This can reduce overheads of configured CSI-RS resources and improve resource utilization.

Before the communication method provided in the embodiments is described, the following points should be noted.

1. In the embodiments, "predefined" or "predefinition" may refer to a protocol definition and may be implemented by prestoring corresponding code or a table in a device (for example, including a terminal device and a network device), or in another manner that can be used to indicate related information. An implementation thereof is not limited.

2. In the embodiments, the term "indication" may include a direct indication and an indirect indication or may include an explicit indication and an implicit indication. Information indicated by a piece of information (information used to indicate a data transmission mechanism or $K_2$ CSI-RS resources described below) is referred to as to-be-indicated information. In an implementation process, the to-be-indicated information may be indicated in a plurality of manners. For example, the to-be-indicated information, for example, the to-be-indicated information itself or an index of the to-be-indicated information, may be directly indicated. This is not limited. Alternatively, the to-be-indicated information may be indirectly indicated by indicating other information, where an association relationship exists between the other information and the to-be-indicated information. Alternatively, only a part of the to-be-indicated information may be indicated, and the other part of the to-be-indicated information is known or pre-agreed on. For example, the to-be-indicated information may be further indicated by a pre-agreement (for example, a protocol specification) on whether an information element exists, so that indication overheads are reduced to some extent.

3. In the following embodiments, various terms and English abbreviations, such as control resource set (CORESET), search space set (SSS), and PDCCH candidate, are all examples provided for ease of description, and should not constitute any limitation. The embodiments do not preclude a possibility of defining other terms capable of implementing the same or similar functions in existing or future protocols.

4. In the following embodiments, "first", "second", "third", and various numbers are merely used for distinguishing for ease of description and are not intended to limit the scope of the embodiments. For example, different signaling and different transmission mechanisms are distinguished.

5. The term "protocol" in the embodiments may refer to a standard protocol in the communications field, for example, may include an LTE protocol, an NR protocol, and a related protocol applied to a future communications system. This is not limited.

6. The term "at least one" indicates one or more, and the terms "at least two" and "a plurality of" indicate two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between associated objects. At least one of the following items (pieces) or a similar expression thereof indicates any combination of these items, including a single item (piece) or any combination of a plurality of items (pieces). For example, at least one of a, b, and c may indicate: a, or b, or c, or a and b, or a and c, or b and c, or a and b and c, where a, b, and c may be singular or plural.

The communication method and communications apparatus are hereinafter described in detail with reference to the accompanying drawings. It should be understood that the embodiments may be applied to a wireless communications system, for example, the communications system 100 shown in FIG. 1. A wireless communication connection relationship may exist between two communications apparatuses in the wireless communications system. One of the two communications apparatuses may correspond to the terminal device 110 shown in FIG. 1, for example, may be the terminal device shown in FIG. 1, or may be a chip configured in the terminal device. The other one of the two communications apparatuses may correspond to any one of the network devices 120 to 140 shown in FIG. 1, for example, may be any one of the network devices 120 to 140 shown in FIG. 1, or may be a chip configured in the network device. The other communications apparatus may be another network device (for example, a central processor) than the network devices 120 to 140 or a chip in another network device. This is not limited in the embodiments.

The communication method and the communications apparatus in the embodiments are applicable to both downlink joint transmission and uplink joint transmission. This is not limited. In downlink joint transmission, the network device may use the CJT mechanism. In uplink joint transmission, the network device may use a coherent joint receiving (CJR) mechanism. For ease of understanding, the following uses a CJT mechanism of downlink joint transmission as an example for description.

Figure 4:
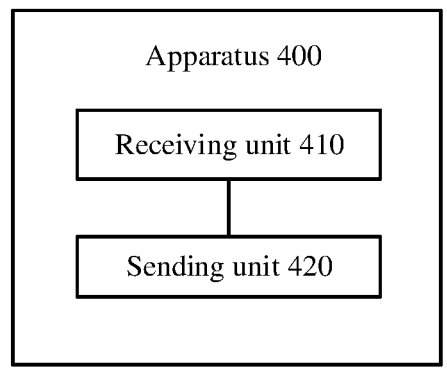
FIG. 4 is a schematic block diagram of a communications apparatus according to an embodiment.

FIG. 4 is a schematic flowchart of a data transmission method 400 according to an embodiment. The method may be applied to the communications system shown in FIG. 1. However, this is not limited in this embodiment. The method 400 includes the following steps.

S410. A network device transmits first signaling to a terminal device, and correspondingly, the terminal device receives the first signaling, where the first signaling is used to configure $K_1$ channel state information-reference signal CSI-RS resources.

It should be understood that the first signaling used to configure the $K_1$ CSI-RS resources may be one piece of signaling or may be a plurality of pieces of signaling. The $K_1$ CSI-RS resources may be configured by the network device for the terminal device by using one piece of signaling or may be configured by the network device for the terminal device by using a plurality of pieces of signaling. This is not limited in this embodiment.

S420. The terminal device reports channel state information CSI, and correspondingly, the network device receives the CSI from the terminal device. The CSI includes a channel quality indicator CQI of a first codeword. A channel measurement part used to calculate the CQI of the first codeword is determined based on channel measurement results of $K_2$ CSI-RS resources, or a channel measurement part used to calculate the CQI of the first codeword is determined based on channel measurements of $K_2$ CSI-RS resources, or a channel measurement part used to calculate the CQI of the first codeword has an association relationship with $K_2$ CSI-RS resources. The $K_2$ CSI-RS resources are resources in the $K_1$ CSI-RS resources, where both $K_1$ and $K_2$ are positive integers, K is greater than 1, and $K_2$ is greater than 1 and less than or equal to $K_1$.

In this embodiment, the CSI reported by the terminal device includes the CQI of the first codeword, and the first codeword may be a codeword that is assumed by the terminal device and that is used for channel coding when the network device subsequently transmits data. It should be understood that the codeword assumed by the terminal device may be different from a codeword in actual data transmission of the network device. For example, if the CSI reported by the terminal device includes a rank indicator RI and a CQI, and a quantity of layers indicated by the RI is 4, the terminal device may recommend the network device to transmit a codeword to the terminal device, where the codeword includes four layers of data. In this case, the CQI represents a channel quality indicator when the four layers of data are transmitted. However, the network device may finally transmit only two layers of data to the terminal device. Therefore, a codeword actually transmitted includes two layers of data. It should be understood that the first codeword may include one codeword, or may include a plurality of codewords, for example, M codewords, where M is a positive integer. When the CSI includes the CQI of the M codewords, the M codewords indicate M codewords that are assumed by the terminal device and that are used for channel coding when the network device transmits data.

It should be understood that the channel measurement part and an interference measurement part are required for determining the CQI of the first codeword. The channel measurement part may refer to a signal measurement part other than the interference measurement part (or a subset of measurement parts other than the interference measurement part), or in other words, refer to a measurement of channel information contributing to a signal rather than interference. The interference herein may be inter-cell interference, inter-user interference, inter-stream interference, or the like. This is not limited herein. That a channel measurement part of the CQI of the first codeword is determined based on channel measurement results of $K_2$ CSI-RS resources may also be known as "the signal measurement part of the CQI of the first codeword is determined based on the channel measurement results of the $K_2$ CSI-RS resources". In other words, based on the $K_2$ CSI-RS resources, the terminal device performs signal (for example, signal power, signal energy, channel strength, or channel energy) measurements and does not perform interference measurements. In this way, the terminal device can perform signal measurements based on a plurality of CSI-RS resources, so that a signal measurement result is determined by the plurality of CSI-RS resources together, that is, signals measured on the plurality of CSI-RS resources all contribute to a final wanted signal.

Further, that a channel measurement part used to calculate the CQI of the first codeword is determined based on channel measurement results of $K_2$ CSI-RS resources may also be understood as "signal power used to calculate the CQI of the first codeword is determined based on accumulation (accumulation) of channel measurements of the $K_2$ CSI-RS resources". The accumulation herein may be understood as weighted summation (summation).

In the communication method in this embodiment, the terminal device selects the $K_2$ CSI-RS resources from the $K_1$ CSI-RS resources configured by the network device and performs channel measurements to obtain the CSI. In addition, the channel measurement part of the CQI of the first codeword in the CSI is determined based on the $K_2$ CSI-RS resources together, so that the CSI is reported more accurately. In a possible scenario, the $K_2$ CSI-RS resources may be transmitted by a plurality of different network devices (for example, base stations or TRPs), that is, the plurality of different network devices provide a CJT mechanism service for the terminal device. The method is used to help accurately report a CQI in a joint transmission mechanism, such as a CQI in a CJT mechanism, and improve data transmission performance.

Optionally, the network device may dynamically indicate, in the $K_1$ CSI-RS resources that are semi-statically configured, the $K_2$ CSI-RS resources used by the terminal device to perform CSI measurements.

Optionally, the method 400 may further include: the network device transmits CSI-RSs on the configured $K_1$ CSI-RS resources (which may be the $K_2$ CSI-RS resources when the $K_2$ CSI-RS resources are indicated by the network device to the terminal device) to the terminal device; and the terminal device receives the CSI-RS s, measures the signals on the $K_2$ CSI-RS resources, and measures interference on other $K_1$—$K_2$ CSI-RS resources, to calculate the CQI, obtain the CSI, and report the CSI to the network device. Further, the network device may determine an MCS based on the CQI and indicate the MCS to the terminal device for data demodulation.

Optionally, port quantities of the $K_1$ CSI-RS resources may be the same or may be different. This is not limited in this embodiment.

Optionally, the $K_1$ CSI-RS resources may be transmitted by a plurality of different network devices. The plurality of different network devices may include the foregoing network device or may not include the foregoing network device. This is not limited in this embodiment.

In an optional embodiment, the CQI of the first codeword is determined conditionally based on a precoding matrix indicator PMI, and a quantity of rows of a precoding matrix indicated by the PMI is equal to a sum of all or some port quantities of the $K_2$ CSI-RS resources.

Optionally, if the quantity of rows of the precoding matrix indicated by the PMI is equal to the sum of some port quantities of the $K_2$ CSI-RS resources, the terminal device may report some selected ports to the network device, or the network device configures some selected ports for the terminal device, or the network device and the terminal device may select some ports according to a predefined rule. For example, if a port quantity of an $i^{th}$ CSI-RS resource in the $K_2$ CSI-RS resources is $N_i$, the quantity of rows of the precoding matrix indicated by the PMI may be $$\sum_{i=1}^{K_2} N_i.$$

Alternatively, if a port quantity of an $i^{th}$ CSI-RS resource in the $K_2$ CSI-RS resources is $N_i$, the network device may indicate R ports by using indication information, and the quantity of rows of the precoding matrix indicated by the PMI may be R×$K_2$. Optionally, the R ports may be ports of a CSI-RS resource having a smallest quantity of ports in the CSI-RS resources. For example, R is a positive integer less than or equal to min $\{N_1, \ldots, N_{K_2}\}$, or the R ports may be ports selected by the terminal device, or the R ports may be ports selected by the network device.

In other words, the CQI of the first codeword is obtained through calculation based on channel measurement results of ports of the $K_2$ CSI-RS resources. The CQI of the first codeword may be determined based on channel measurement results of all or some ports of each of the $K_2$ CSI-RS resources.

Optionally, the PMI may be reported by the terminal device. For example, the CSI includes the PMI. Alternatively, the PMI may be determined by the network device. For example, the CSI reporting mode is a non-PMI reporting mode.

Optionally, the $K_2$ CSI-RS resources may be non-beamformed CSI-RSs or may be beamformed CSI-RSs. A precoding matrix indicated by a PMI measured and reported for a non-beamformed CSI-RS may be selected from a type I or type II (Type I/II) codebook, or selected from a multi-panel codebook, or selected from a multi-station CJT transmission codebook. This is not limited in this embodiment. A precoding matrix indicated by a PMI measured and reported for a beamformed CSI-RS may be selected from a multi-station CJT port selection codebook.

It should be understood that the non-beamformed CSI-RS is usually a CSI-RS transmitted when the network device has not determined the precoding matrix for transmitting data to the terminal device. In this case, reporting the PMI by the terminal device may assist the network device in determining the precoding matrix for transmitting data. However, the beamformed CSI-RS is usually a CSI-RS transmitted when the network device has determined the precoding matrix for transmitting data to the terminal device. In this case, the CSI-RS has been weighted by using the precoding matrix. Therefore, the terminal device measures an equivalent channel through which data is transmitted. In addition, different ports of a same CSI-RS correspond to equivalent channels through which different layers of data are transmitted. Further, in the CJT transmission mechanism, corresponding ports of these different CSI-RSs correspond to a same layer of data. Optionally, $K_1$ network devices perform CJT transmission, and a beamformed CSI-RS resource transmitted by an $i^{th}$ network device has $X_i$ ports. When the terminal device performs CSI measurements on the $K_2$ ($K_2 \leq K_1$) CSI-RS resources, equivalent channels experienced by future X layers of data are measured, where an equivalent channel experienced by an $i^{th}$ layer of data is determined by an $i^{th}$ port of the $K_2$ CSI-RS resources. For example, an $i^{th}$ port of one CSI-RS resource may be determined based on a port number and a predefined order. X is a positive integer less than or equal to min $\{X_1, \ldots, X_{K_1}\}$, and min $\{X_1, \ldots, X_{K_1}\}$ indicates a minimum value of $X_1, X_2, \ldots,$ and $X_{K_2}$.

In an optional embodiment, the CSI is determined based on a channel measurement result of a $k^{th}$ CSI-RS resource in the $K_2$ CSI-RS resources and a $k^{th}$ first parameter, where the $k^{th}$ first parameter is determined based on a matrix part corresponding to a port of the $k^{th}$ CSI-RS resource in the precoding matrix and a reference precoding matrix.

In other words, the CSI may be determined based on a channel measurement result of one CSI-RS resource (that is, the $k^{th}$ CSI-RS resource) in the $K_2$ CSI-RS resources and a first parameter corresponding to the CSI-RS resource. Further, the CSI may be determined based on a channel measurement result of each of the $K_2$ CSI-RS resources and a first parameter corresponding to the CSI-RS resource. In this case, k=1, 2, . . . , $K_2$, indicating that k traverses 1, 2, . . . , $K_2$.

Optionally, the reference precoding matrix is a matrix part corresponding to a port of one of the $K_1$ CSI-RS resources in the precoding matrix. Optionally, the reference precoding matrix is a matrix part corresponding to a port of one of the $K_2$ CSI-RS resources in the precoding matrix. Optionally, an identifier of a CSI-RS resource corresponding to the reference precoding matrix is reported by the terminal device to the network device.

Optionally, the $k^{th}$ first parameter is determined based on partial energy per resource element (EPRE) of a first PDSCH associated with the $k^{th}$ CSI-RS resource, and reference EPRE, where the partial EPRE of the first PDSCH is a part of EPRE of the first PDSCH, and the EPRE of the first PDSCH is determined based on partial EPRE of a first PDSCH associated with the $K_2$ CSI-RS resources. It should be understood that the first PDSCH is transmitted by a plurality of network devices together and that the EPRE of the first PDSCH is contributed by the plurality of network devices together. The partial EPRE of the first PDSCH associated with the $k^{th}$ CSI-RS resource may also be understood as EPRE of the first PDSCH transmitted by a network device corresponding to the $k^{th}$ CSI-RS resource. The "partial EPRE of the first PDSCH" may also have another name. This is not limited in this embodiment.

The first parameter may be further defined in another manner. When the $K_2$ CSI-RS resources correspond to $K_2$ network devices that transmit the first PDSCH to the terminal device by using the CJT mechanism, the $k^{th}$ first parameter is determined based on the EPRE of the first PDSCH transmitted by the network device corresponding to the $k^{th}$ CSI-RS resource, and the reference EPRE.

For example, the terminal device may assume that a received signal of the first PDSCH on a resource element (resource element, RE) is $y\sqrt{\tilde{p}_{c,1}}h_1w_1s+ \ldots + \sqrt{\tilde{p}_{c,1}}h_{K_2}w_{K_2}s+n$, where $h_kw_k$ (k=1, . . . , $K_2$) is channel information obtained based on a measurement of the $k^{th}$ CSI-RS resource in the $K_2$ CSI-RS resources and the precoding matrix indicated by the PMI, $\tilde{p}_{c,k}$ is power used by the network device associated with the $k^{th}$ CSI-RS resource, s is a data symbol transmitted to the terminal device, and n is interference and noise. In this example, the partial EPRE of the first PDSCH associated with the $k^{th}$ CSI-RS resource is $\tilde{p}_{c,k}$, or the partial EPRE of the first PDSCH associated with the $k^{th}$ CSI-RS resource is determined based on $\tilde{p}_{c,k}$. Because the first PDSCH is transmitted by the plurality of network devices together, the EPRE of the first PDSCH may be defined as $$\sum_{k=1}^{K_2} \tilde{p}_{c,k} \text{ or } \sum_{k=1}^{K_2} \tilde{p}_{c,k} + \sum_{i \neq j} \sqrt{\tilde{p}_{c,i}\tilde{p}_{c,j}},$$

or may be defined in another manner. This is not limited herein. Therefore, the EPRE of the first PDSCH is determined by (for example, by summation of) EPRE contributed when network devices associated with the $K_2$ CSI-RSs transmit the first PDSCH. Because the network devices associated with the $K_2$ CSI-RS resources contribute only a part of EPRE of the first PDSCH, $\tilde{p}_{c,k}$ is referred to as partial EPRE of the first PDSCH in this embodiment.

In a possible implementation, the reference EPRE may be EPRE of the first PDSCH transmitted by a network device corresponding to one of the $K_1$ (or $K_2$) CSI-RS resources. For example, if the CSI-RS resource is referred to as a reference CSI-RS resource, the reference CSI-RS resource may be selected by the terminal device, or indicated by the network device, or determined according to a predefined rule (for example, a CSI-RS resource with a smallest ID is selected).

In another possible implementation, the reference EPRE is EPRE of a second PDSCH transmitted by using a non-CJT mechanism. In a current 3rd Generation Partnership Project (3GPP) protocol, a ratio of PDSCH EPRE to CSI-RS EPRE is defined for a CSI-RS resource. For example, the EPRE of the second PDSCH is the PDSCH ERPE in the ratio.

It should be understood that the first parameter can be defined to reflect that when different network devices transmit a same PDSCH (for example, the first PDSCH) by using the CJT transmission mechanism, the different network devices may allocate different power to meet a data requirement of a network (for example, increasing a data throughput, improving fairness, or reducing energy consumption). The first parameter may be further defined based on an existing definition of a ratio of PDSCH EPRE to CSI-RS EPRE. This helps configure a same CSI-RS resource for a plurality of terminal devices and helps prevent the network device from separately configuring different CSI-RS resources for a non-CJT transmission terminal device and a CJT transmission terminal device, thereby reducing CSI-RS resource overheads of the network device.

Optionally, the network device may configure, by using signaling (for example, RRC signaling), a same CSI-RS resource for a plurality of terminal devices served by the network device, configure a second parameter for the CSI-RS resource (for example, a ratio of second PDSCH EPRE to CSI-RS ERPE), and further configure the first parameter by using different signaling (for example, a ratio of the first PDSCH EPRE to the second PDSCH EPRE). In this case, the network device needs to transmit only one CSI-RS resource, and the terminal device may select, based on a PDSCH transmission mechanism of the terminal device, to calculate the CQI by using only the first parameter or to calculate the CQI by using both the first parameter and the second parameter.

It should be understood that the $K_2$ network devices in this embodiment may be physical $K_2$ TRPs or may be virtual $K_2$ TRPs. This is not limited in this embodiment. For example, if there are $K_2/2$ TRPs, and each TRP has two antenna panels, and each panel transmits one CSI-RS resource, this is equivalent to presence of K2 virtual TRPs for the terminal device.

In an optional embodiment, that the CSI is determined based on a channel measurement result of a $k^{th}$ CSI-RS resource in the $K_2$ CSI-RS resources and a $k^{th}$ first parameter may also be understood as "the signal power used to calculate the CQI of the first codeword in the CSI is determined based on accumulation of the channel measurements of the $K_2$ CSI-RS resources". Optionally, a weighting coefficient in accumulation is determined based on $K_2$ first parameters.

In an optional embodiment, the first parameter is configured by the network device for the terminal device by using second signaling; or the first parameter is reported by the terminal device, and the CSI includes the first parameter.

In other words, the first parameter may be configured by the network device for the terminal device or may be reported by the terminal device. This is not limited in this embodiment. Optionally, the $k^{th}$ first parameter may include one first parameter, or may include a plurality of first parameters. Optionally, a first parameter of the $k^{th}$ CSI-RS resource may be indicated by the network device or reported by the terminal device.

For example, if the first parameter of the $k^{th}$ CSI-RS resource is indicated by the network device, the network device may configure one first parameter for all ports of the $k^{th}$ CSI-RS resource. Alternatively, the network device may configure one first parameter for each group of ports of the $k^{th}$ CSI-RS resource, where each group of ports includes at least one port. Alternatively, the network device may configure one first parameter for each column group of a matrix part corresponding to a port of the $k^{th}$ CSI-RS resource in the precoding matrix, where each column group includes at least one column.

For example, if the first parameter of the $k^{th}$ CSI-RS resource is reported by the terminal device, the terminal device may report one first parameter for all ports of the $k^{th}$ CSI-RS resource. Alternatively, the terminal device may report one first parameter for each group of ports of the $k^{th}$ CSI-RS resource, where each group of ports includes at least one port. Alternatively, the terminal device may report one first parameter for each column group of a matrix part corresponding to a port of the $k^{th}$ CSI-RS resource in the precoding matrix, where each column group includes at least one column.

An order of the CSI-RS resources may be determined based on ordering according to an agreed rule. For example, the order of the CSI-RS resources may be determined in ascending order (or descending order) of IDs of the CSI-RS resources. The $k^{th}$ CSI-RS resource represents a $k^{th}$ CSI-RS resource in the order.

Optionally, the $k^{th}$ first parameter is determined based on energy (or power) of a matrix part corresponding to a port of the $k^{th}$ CSI-RS resource in the precoding matrix and energy (or power) of a reference precoding matrix.

Optionally, the $k^{th}$ first parameter is determined based on a difference or ratio between energy (or power) of a matrix part corresponding to a port of the $k^{th}$ CSI-RS resource in the precoding matrix and energy (or power) of a reference precoding matrix.

In this embodiment, a difference or ratio between A and B may be understood as "A/B" or "A−B" or may be understood as "B/A" or "B−A". This is not limited in this embodiment. Therefore, a difference or ratio between energy of a matrix part corresponding to a port of the $k^{th}$ CSI-RS resource in the precoding matrix and energy of a reference precoding matrix may be a ratio of the energy of the matrix part corresponding to the port of the $k^{th}$ CSI-RS resource in the precoding matrix to the energy of the reference precoding matrix, or the energy of the matrix part corresponding to the port of the $k^{th}$ CSI-RS resource in the precoding matrix minus the energy of the reference precoding matrix, or may be a ratio of the energy of the reference precoding matrix to the energy of the matrix part corresponding to the port of the $k^{th}$ CSI-RS resource in the precoding matrix, or the energy of the reference precoding matrix minus the energy of the matrix part corresponding to the port of the $k^{th}$ CSI-RS resource in the precoding matrix.

In this embodiment, "energy" or "power" may also be defined as "a norm of a matrix", for example, a frobenius (F) norm of a matrix. This is not limited herein.

It should be understood that the matrix part is a matrix including some elements in a matrix and may be referred to as a precoding matrix part or another name. This is not limited in this embodiment.

In this embodiment, if the reference precoding matrix is a matrix part corresponding to a port of one of the $K_2$ CSI-RS resources in the precoding matrix, at least one of first parameters corresponding to the CSI-RS resource is 1.

For example, it is assumed that $K_2$ is equal to 2 and that either of the two CSI-RS resources includes eight ports. Therefore, the terminal device measures a CSI-RS with 16 ports and determines a 16-row and r-column precoding matrix $w=[\Delta P_1 *W_1; \Delta P_2 *W_2]$, where r is a rank of the precoding matrix. $W_1$ is an 8*r matrix, with total power normalized to 1, and is a matrix part corresponding to eight ports of a first CSI-RS resource; and $W_2$ is an 8*r matrix, with total power normalized to 1, and is a matrix part corresponding to eight ports of a second CSI-RS resource. $\Delta P_1$ is determined based on a first one of first parameters, and $\Delta P_2$ is determined based on a second one of the first parameters. Further, assuming that the reference precoding matrix is a matrix part corresponding to a port of the first CSI-RS resource in the precoding matrix W and that $\Delta P_1$ is equal to 1, the precoding matrix is $W=[W_1; \Delta P_2 *W_2]$.

Optionally, the two CSI-RS resources in this embodiment are non-beamformed CSI-RS resources.

For example, it is assumed that each of $K_2=2$ CSI-RS resources includes N ports and that port numbers of N ports of the $k^{th}$ CSI-RS resource are $n_k$, $n_k+1$, $n_k+N-1$. An $i^{th}$ port of the $k^{th}$ (k=1, $K_2$) CSI-RS corresponds to a channel measurement of the $i^{th}$ layer of data, where i=1, 2, ..., N. The network device configures the terminal device to report the PMI and the CQI and indicates R (R is an integer less than or equal to N) to the terminal device by using signaling. In this case, the terminal device may measure R ports of each CSI-RS resource (the R ports may be selected according to a predefined rule, or according to a signaling indication of the network device, or according to reporting of the terminal). Assuming that R is equal to N, the terminal device may determine that the precoding matrix indicated by the PMI has the following form:

$$W = \begin{bmatrix} \Delta P_{11} & & & \\ & \ddots & & \\ & & \Delta P_{1N} & \\ \Delta P_{21} & & & \\ & \ddots & & \\ & & \Delta P_{2N} \end{bmatrix}.$$

Optionally, the precoding matrix may be split into the following equivalent form:

$$W = \begin{bmatrix} \Delta P_{11} & & & \\ & \ddots & & \\ & & \Delta P_{1N} & \\ \Delta P_{21} & & & \\ & \ddots & & \\ & & \Delta P_{2N} \end{bmatrix} = \begin{bmatrix} \Delta P_1 & \\ & \Delta P_2 \end{bmatrix} \begin{bmatrix} I_N \\ I_N \end{bmatrix},$$

where $\Delta P_1$ is a diagonal matrix formed by $\Delta P_{1k}$ and is determined based on the first one of the first parameters; $\Delta P_2$ is a diagonal matrix formed by $\Delta P_{2k}$ and is determined based on the second one of the first parameters, where k=1, $K_2$; and $I_N$ is an N-dimensional identity matrix.

Optionally, the two CSI-RS resources in this embodiment are beamformed CSI-RS resources.

In a possible implementation, the network device determines the first parameter, and configures the first parameter for the terminal device by using the second signaling. The network device may dynamically determine, based on information obtained by the network device itself, for example, a multi-user (MU) pairing status of each of a plurality of network devices (such as TRPs) that schedule data for the terminal device through coherent transmission, a power allocation status when transmitting a physical downlink shared channel (PDSCH) to the terminal device. Therefore, the network device can determine the first parameter and dynamically notify the terminal device of the first parameter, to more dynamically match a channel change and/or the multi-user (MU) pairing status for transmitting the PDSCH, so that CQI calculation is more accurate.

In another possible implementation, the terminal device determines and reports the first parameter by using the CSI. The terminal device may measure a CSI-RS transmitted by each network device (for example, a TRP), to more accurately reflect a difference in channel quality between different network devices and the terminal device in the current CSI, so that the first parameter is more accurately calculated and fed back and that CQI calculation for a single user (SU) is more accurate.

Optionally, the second signaling used to configure the first parameter is the first signaling (that is, the second signaling and the first signaling are the same signaling). The first signaling may be radio resource control (RRC) signaling.

In a possible implementation, the second signaling is RRC signaling.

In another possible implementation, the second signaling is a media access control control element (MAC CE) or downlink control information (DCI). Because scheduling of the PDSCH is dynamic, power used by different network devices (for example, base stations or TRPs) to transmit a same data stream can be dynamically adjusted based on the CSI and/or the MU pairing status, the first parameter can be quickly configured by using the MAC CE or DCI, and a better transmission effect can be achieved.

In still another possible implementation, the second signaling includes RRC signaling, a MAC CE, or DCI. Optionally, the MAC CE may be used to configure a first parameter associated with periodic or semi-persistent CSI; and the DCI is used to indicate a first parameter associated with aperiodic CSI. If the first parameter is configured by default through RRC, the network device may refresh the first parameter by using the MAC CE or the DCI. If the network device does not transmit the MAC CE or the DCI, by default, the terminal device may use the first parameter configured through RRC, thereby implementing a more flexible configuration.

In an optional embodiment, the CSI is determined based on the following information: the channel measurement result of the $k^{th}$ CSI-RS resource, the $k^{th}$ first parameter, and a second parameter of the $k^{th}$ CSI-RS resource, where the second parameter of the $k^{th}$ CSI-RS resource is determined based on a physical downlink shared channel PDSCH and the $k^{th}$ CSI-RS resource.

Optionally, the network device may configure a plurality of first parameters and/or a plurality of second parameters by using RRC signaling, and then select one first parameter and/or one second parameter from the plurality of configured first parameters and/or the plurality of configured second parameters by using a MAC CE or DCI. Optionally, the network device may configure a plurality of first parameters and one second parameter by using RRC signaling, and then select one first parameter from the plurality of configured first parameters by using a MAC CE or DCI.

Optionally, the second parameter of the $k^{th}$ CSI-RS resource is determined based on energy per resource element (EPRE) of the physical downlink shared channel PDSCH and EPRE of the $k^{th}$ CSI-RS resource.

Optionally, the second parameter of the $k^{th}$ CSI-RS resource is a difference or ratio between energy per resource element EPRE of the physical downlink shared channel PDSCH and EPRE of the $k^{th}$ CSI-RS resource.

In this embodiment, a difference or ratio between A and B may be understood as "A/B" or "A−B" or may be understood as "B/A" or "B−A". This is not limited in this embodiment. Therefore, the difference or ratio between the EPRE of the PDSCH and the EPRE of the $k^{th}$ CSI-RS resource may be a ratio of the EPRE of the PDSCH to the EPRE of the $k^{th}$ CSI-RS resource, or the EPRE of the PDSCH minus the EPRE of the $k^{th}$ CSI-RS resource, or may be a ratio of the EPRE of the $k^{th}$ CSI-RS resource to the EPRE of the PDSCH, or the EPRE of the $k^{th}$ CSI-RS resource minus the EPRE of the PDSCH.

In a first possible implementation, the CQI of the first codeword may be obtained through calculation by using the following formula:

$$CQI=f(x_1,x_2,\ldots,x_{K_2},n),$$

where $x_i=\sqrt{p_{c,i}\Delta p_i}H_i$, $i\in\{1, 2, \ldots, K_2\}$, $p_{c,i}$ is determined based on a second parameter of the $i^{th}$ CSI-RS resource in the $K_2$ CSI-RS resources, $\Delta p_i$ is determined based on an $i^{th}$ first parameter, $H_i$ is determined by the terminal device based on a channel measurement part of the $i^{th}$ CSI-RS resource, and n indicates interference and/or noise obtained by the terminal device by performing a measurement.

In this embodiment, $p_{c,i}$ is determined based on the second parameter of the $i^{th}$ CSI-RS resource in the $K_2$ CSI-RS resources, and this may include a plurality of cases. For example, $p_{c,i}$ is the second parameter of the $i^{th}$ CSI-RS resource in the $K_2$ CSI-RS resources. For another example, the second parameter of the $i^{th}$ CSI-RS resource in the $K_2$ CSI-RS resources is a dB value, and $p_{c,i}$ is a linear value determined based on the dB value. Other similar cases are not listed.

Further, $H_i=h_iw_i$ where $h_i$ is determined by the terminal device based on a channel matrix measured on the $i^{th}$ CSI-RS resource, and $w_i$ is a matrix part after power normalization is performed on a matrix part corresponding to the $i^{th}$ CSI-RS resource in the precoding matrix indicated by the PMI. The power normalization herein may be performing overall power normalization on each matrix part or may be performing overall power normalization after performing power normalization on each column. In this case, the CQI of the first codeword may be obtained through calculation by using the following formula:

$$CQI = f\left(\frac{p_{c,1}\Delta p_1|h_1w_1|^2+\ldots+p_{c,i}\Delta p_i|h_iw_i|^2+\ldots+p_{c,K_2}\Delta p_{K_2}|h_{K_2}w_{K_2}|^2}{n}\right).$$

In a second possible implementation, the CQI of the first codeword may be obtained through calculation by using the following formula:

$$CQI=f(|x_1+\ldots+x_{K_2}|^2,n),$$

where $x_i=\sqrt{p_{c,i}\Delta p_i}H_i$, $i\in\{1, 2, \ldots, K_2\}$, $p_{c,i}$ is determined based on a second parameter of the $i^{th}$ CSI-RS resource in the $K_2$ CSI-RS resources, $\Delta p_i$ is determined based on an $i^{th}$ first parameter, $H_i$ is determined by the terminal device based on a channel measurement part of the $i^{th}$ CSI-RS resource, and n indicates interference and/or noise obtained by the terminal device by performing a measurement.

Further, $H_i=h_iw_i$, and the CQI of the first codeword may be obtained through calculation by using the following formula:

$$CQI=f(|\sqrt{p_{c,1}\Delta P_1}h_1w_1+\ldots+\sqrt{p_{c,K_2}\Delta P_{K_2}}h_{K_2}w_{K_2}|^2,n).$$

It should be understood that the parameters in the second possible implementation are the same as the parameters in the first possible implementation. Details are not described again. $f(\ )$ is a function, and different formulas may correspond to different functions. This is not limited in this embodiment.

In an optional embodiment, the CSI is determined based on a first transmission mechanism, a channel measurement result of a $k^{th}$ CSI-RS resource in the $K_2$ CSI-RS resources, and a third parameter of the $k^{th}$ CSI-RS resource; and the method further includes: the network device transmits third signaling to the terminal device, and correspondingly, the terminal device receives the third signaling, where the third signaling is used to configure the third parameter of the $k^{th}$ CSI-RS resource in the $K_2$ CSI-RS resources, and the third parameter is determined based on a PDSCH and the $k^{th}$ CSI-RS resource in the first transmission mechanism; and the network device transmits fourth signaling to the terminal device, and correspondingly, the terminal device receives the fourth signaling, where the fourth signaling is used to configure a fourth parameter of the $k^{th}$ CSI-RS resource, and the fourth parameter is determined based on a PDSCH and the $k^{th}$ CSI-RS resource in a second transmission mechanism.

In other words, the CSI may be determined based on a channel measurement result of one CSI-RS resource (that is, the $k^{th}$ CSI-RS resource) in the $K_2$ CSI-RS resources and a third parameter corresponding to the CSI-RS resource. Further, the CSI may be determined based on a channel measurement result of each of the $K_2$ CSI-RS resources and a third parameter corresponding to the CSI-RS resource. In this case, k=1, 2, . . . , $K_2$, indicating that k traverses 1, 2, . . . , $K_2$.

In this embodiment, the network device configures parameters in different transmission mechanisms for the terminal device, where the first transmission mechanism corresponds to the third parameter, and the second transmission mechanism corresponds to the fourth parameter; and the terminal device may flexibly select a corresponding parameter based on a current transmission mechanism to calculate the CQI. The first transmission mechanism may be the CJT mechanism, and the second transmission mechanism may be a single-station transmission mechanism or an NCJT mechanism.

It should be understood that, in the first transmission mechanism, a PDSCH used to calculate the third parameter of each of the $K_2$ CSI-RS resources corresponds to a same PDSCH.

Optionally, the third parameter is determined based on the EPRE of the PDSCH and the EPRE of the $k^{th}$ CSI-RS resource in the first transmission mechanism. The fourth parameter is determined based on the EPRE of the PDSCH and the EPRE of the $k^{th}$ CSI-RS resource in the second transmission mechanism.

Optionally, the third parameter is a difference or ratio between the EPRE of the PDSCH and the EPRE of the $k^{th}$ CSI-RS resource in the first transmission mechanism. The fourth parameter is a difference or ratio between the EPRE of the PDSCH and the EPRE of the $k^{th}$ CSI-RS resource in the second transmission mechanism.

In this embodiment, a difference or ratio between A and B may be understood as "A/B" or "A-B" or may be understood as "B/A" or "B-A". Details are not described herein again.

In a first possible implementation, the CQI of the first codeword may be obtained through calculation by using the following formula:

$$CQI=f(x_1,x_2,\ldots,x_{K_2},n)$$

where $x_i=\sqrt{p_{c,i}}H_i$, $i\in\{1, 2, \ldots, K_2\}$, $p_{c,i}$ is determined based on a third parameter of the $i^{th}$ CSI-RS resource in the $K_2$ CSI-RS resources, $H_i$ is determined by the terminal device based on a channel measurement part of the $i^{th}$ CSI-RS resource, and n indicates interference and/or noise obtained by the terminal device by performing a measurement.

Further, $H_i=h_iw_i$, where $h_i$ is determined by the terminal device based on the channel measurement part of the $i^{th}$ CSI-RS resource, and $w_i$ is a matrix after power normalization is performed on a matrix part corresponding to the $i^{th}$ CSI-RS resource in the precoding matrix indicated by the PMI. In this case, the CQI of the first codeword may be obtained through calculation by using the following formula:

$$CQI = f\left(\frac{p_{c,1}|h_1w_1|^2 + \ldots + p_{c,i}|h_iw_i|^2 + \ldots + p_{c,K_2}|h_{K_2}w_{K_2}|^2}{n}\right).$$

In a second possible implementation, the CQI of the first codeword may be obtained through calculation by using the following formula:

$$CQI=f(|\sqrt{p_{c,i}}h_1w_1+ \ldots +\sqrt{p_{c,K_2}}h_{K_2}w_{K_2}|^2,n)$$

Further, $H_i=h_iw_i$, and the CQI of the first codeword may be obtained through calculation by using the following formula:

$$CQI=f(|\sqrt{p_{c,i}}h_1w_1+ \ldots +\sqrt{p_{c,K_2}}h_{K_2}w_{K_2}|^2,n).$$

It should be understood that the parameters in the second possible implementation are the same as the parameters in the first possible implementation. Details are not described again. $f( )$ is a function, and different formulas may correspond to different functions. This is not limited in this embodiment.

Optionally, the third signaling used to configure the third parameter is the first signaling (that is, the third signaling and the first signaling are the same signaling). Optionally, the fourth signaling used to configure the fourth parameter is the first signaling (that is, the fourth signaling and the first signaling are the same signaling).

In a possible implementation, the third signaling and/or the fourth signaling may be RRC signaling, or a MAC CE, or DCI. Because scheduling of the PDSCH is dynamic, power used by different network devices (for example, base stations or TRPs) to transmit a same data stream can be dynamically adjusted based on the CSI, the third parameter and/or the fourth parameter can be quickly configured by using the MAC CE or DCI, and a better transmission effect can be achieved.

In still another possible implementation, the third signaling and/or the fourth signaling may include RRC signaling, or a MAC CE, or DCI. Optionally, the MAC CE may be used to configure a third parameter and/or a fourth parameter corresponding to a CSI-RS resource associated with periodic or semi-persistent CSI; and the DCI is used to indicate a third parameter and/or a fourth parameter corresponding to a CSI-RS resource associated with aperiodic CSI. If the network device configures the third parameter and/or the fourth parameter by default by using the RRC signaling, the network device may refresh the third parameter and/or the fourth parameter by using the MAC CE or the DCI. If the network device does not transmit the MAC CE or the DCI, by default, the terminal device may use the third parameter and/or the fourth parameter configured through RRC, thereby implementing a more flexible configuration.

Optionally, the network device may configure a plurality of third parameters and/or a plurality of fourth parameters by using RRC signaling, and then select one third parameter and/or one fourth parameter from the plurality of configured third parameters and/or the plurality of configured fourth parameters by using a MAC CE or DCI. Optionally, the network device may configure a plurality of third parameters and one fourth parameter by using RRC signaling, and then select one third parameter from the plurality of configured third parameters by using a MAC CE or DCI.

In an optional embodiment, an interference measurement part of the CQI of the first codeword is determined based on interference measurement results of $K_3$ interference measurement resources IMRs, where $K_3$ is a positive integer.

In this embodiment, the $K_3$ IMRs are used to measure interference outside a candidate coordination set. The candidate coordination set may also be referred to as a coordination set. The candidate coordination set includes a plurality of network devices, and the plurality of network devices are network devices that serve the terminal device by using the CJT mechanism. Therefore, the interference outside the candidate coordination set is interference caused to the terminal device by a network device other than a plurality of network devices that transmit a PDSCH to the terminal device by using the CJT mechanism.

The $K_3$ interference measurement resources IMRs may be configured by the network device for the terminal device by using signaling. Optionally, the network device may configure the $K_3$ IMRs by using the first signaling.

Figure 3:
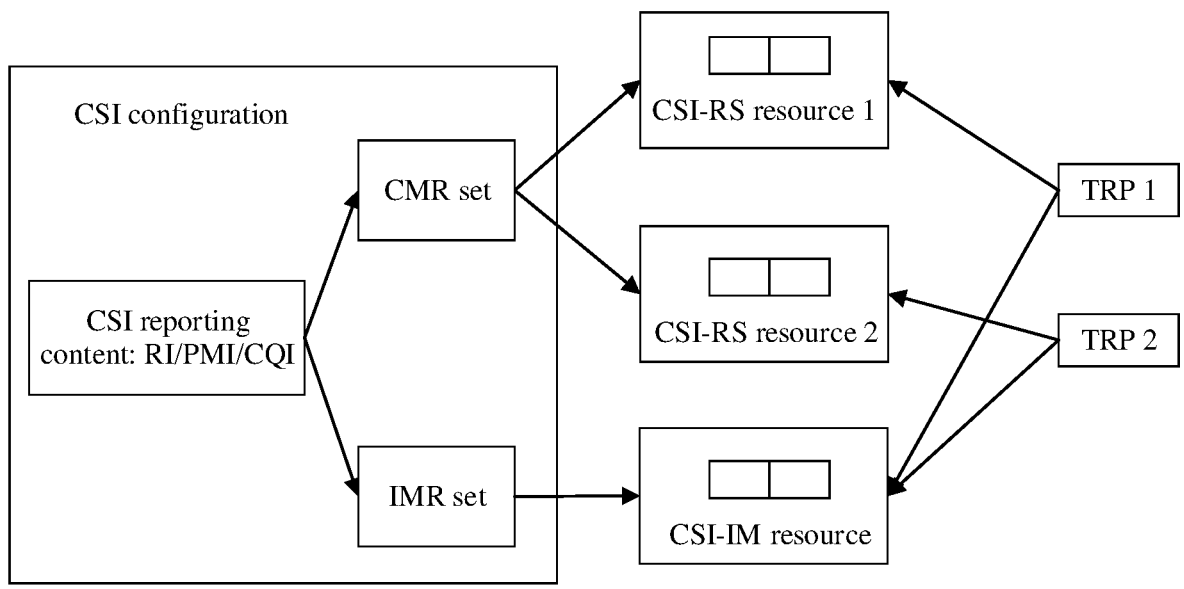
FIG. 3 is a schematic diagram of an association relationship between a channel state information configuration and resources according to an embodiment.

FIG. 3 is a schematic diagram of an association relationship between a CSI configuration and resources according to an embodiment. In FIG. 3, the CSI configuration includes CSI reporting content: a rank indicator (RI), a PMI, and a CQI. The CSI configuration further includes one CMR set and one IMR set. The CMR set includes two CSI-RS resources: a CSI-RS resource 1 and a CSI-RS resource 2. The IMR set includes one CSI-IM resource. The TRP 1 may correspond to the CSI-RS resource 1 and the CSI-IM resource. The TRP 2 may correspond to the CSI-RS resource 2 and the CSI-IM resource. A non-zero power reference signal is transmitted on the CSI-RS resource, and a zero power reference signal is transmitted on the CSI-IM resource.

In an optional embodiment, the interference measurement part of the CQI of the first codeword is determined based on measurement results of $K_4$ CSI-RS resources other than the $K_2$ CSI-RS resources in the $K_1$ CSI-RS resources, where $K_4$ is less than or equal to a difference between $K_1$ and $K_2$, the interference measurement part is determined based on summation (or accumulation) of interference information measured on the $K_4$ CSI-RS resources, and interference information measured on a $j^{th}$ CSI-RS resource in the $K_4$ CSI-RS resources is determined based on an interference measurement result of the $j^{th}$ CSI-RS resource.

In other words, the interference measurement part may be determined based on an interference measurement result of one CSI-RS resource (that is, the $j^{th}$ CSI-RS resource) in the $K_4$ CSI-RS resources. Further, the interference measurement part may be determined based on an interference measurement result of each of the $K_4$ CSI-RS resources. In this case, $j=1, 2, \ldots, K_4$, indicating that j traverses $1, 2, \ldots, K_4$.

Optionally, an interference measurement on the $j^{th}$ CSI-RS resource is determined based on an interference channel measured on the resource. Optionally, that the interference measurement part is determined based on summation (or accumulation) of interference information measured on the $K_4$ CSI-RS resources may be understood as "interference power or interference energy is determined based on interference channels measured on the $K_4$ CSI-RS resources and $K_4$ first parameters". Definitions of the first parameters are the same as the foregoing and are not described again. Alternatively, that the interference measurement part is determined based on summation (or accumulation) of interference information measured on the $K_4$ CSI-RS resources may be understood as "interference power or interference energy is determined based on interference channels measured on the $K_4$ CSI-RS resources and $K_4$ third parameters". Definitions of the third parameters are the same as the foregoing and are not described again.

As described above, when $K_2$ is less than $K_1$, because the channel measurement part of the CQI of the first codeword of the terminal device is determined based on the channel measurement results of the $K_2$ CSI-RS resources, if the network device transmits CSI-RSs on other $K_4$ CSI-RS resources, interference inside a candidate coordination set is caused to the terminal device.

The foregoing two types of interference may be both referred to as inter-cell interference. The first type of interference is referred to as interference outside the candidate coordination set, and the second type of interference is referred to as interference inside the candidate coordination set. In a possible implementation, the interference measurement part of the CQI of the first codeword may be determined based on an interference measurement result of the first type of interference. In another possible implementation, the interference measurement part of the CQI of the first codeword may be determined based on an interference measurement result of the second type of interference. In still another possible implementation, the interference measurement part of the CQI of the first codeword may be determined based on an interference measurement result of the first type of interference and an interference measurement result of the second type of interference together.

It should be understood that the interference measurement result may be an interference channel, interference energy, interference power, an interference covariance matrix, or the like. This is not limited in this embodiment. For example, using the interference covariance matrix as an example, for the second type of interference, the terminal device may measure a downlink channel matrix $H_j$ on the $j^{th}$ CSI-RS resource in the $K_4$ CSI-RSs, and calculate the interference covariance matrix $R_j = H_j * congj(H_j)$ based on where congj( ) indicates conjugate transpose, and $j = 1, 2, \ldots, K_4$.

Optionally, the interference information measured on the $j^{th}$ CSI-RS resource in the $K_4$ CSI-RS resources is determined based on the interference measurement result of the $j^{th}$ CSI-RS resource and the first parameter and/or the second parameter. This is not limited in this embodiment. In other words, for the second type of interference, the interference measurement part of the CQI of the first codeword may be determined according to any one of the following:

$$\sum_{j=1}^{K_4} R_j p_{c,j} \Delta p_j; \text{ or } \sum_{j=1}^{K_4} R_j p_{c,j}; \text{ or } \sum_{j=1}^{K_4} R_j \Delta p_j; \text{ or } \left| \sum_{j=1}^{K_4} H_j \sqrt{p_{c,j} \Delta p_j} \right|^2,$$

where $R_j$ is a covariance matrix obtained by performing a measurement on the $j^{th}$ CSI-RS resource, $p_{c,j}$ indicates a second parameter of the $j^{th}$ CSI-RS resource in the $K_4$ CSI-RS resources, and $\Delta p_j$ indicates a $j^{th}$ first parameter.

In an optional embodiment, a first quasi-co-location QCL-type D parameter and a second QCL-type D parameter are configured for one of the $K_2$ CSI-RS resources; the first QCL-type D parameter is associated with a first reference signal, and the second QCL-type D parameter is associated with a second reference signal; and the first reference signal is used to indicate the terminal device to receive a receive beam of the CSI-RS in the first transmission mechanism, and the second reference signal is used to indicate the terminal device to receive a receive beam of the CSI-RS in the second transmission mechanism; or the first reference signal and the second reference signal are used to indicate the terminal device to receive a receive beam of the CSI-RS in the first transmission mechanism.

It should be understood that the two quasi-co-location (QCL-type D) parameters are merely examples for description. In this embodiment, a plurality of sets of parameters may be configured for one CSI-RS resource. For example, two QCL-type D parameters including the first QCL-type D parameter and the second QCL-type D parameter may be configured for one CSI-RS resource. Different transmission mechanisms may correspond to different QCL-type D parameters. Because the QCL-type D parameters are associated with reference signals, different reference signals may be used for different transmission mechanisms.

In a first possible implementation, the first reference signal associated with the first QCL-type D parameter is used to indicate to receive the receive beam of the CSI-RS in the first transmission mechanism, and the second reference signal associated with the second QCL-type D parameter is used to indicate to receive the receive beam of the CSI-RS in the second transmission mechanism.

In a second possible implementation, the first reference signal associated with the first QCL-type D parameter and the second reference signal associated with the second QCL-type D parameter are jointly used to indicate to receive the receive beam of the CSI-RS in the first transmission mechanism.

The receive beam may also be referred to as a receive filter (filters) or a spatial domain receive filter (spatial domain receive filters). This is not limited in this embodiment.

In the second possible implementation, the terminal device may select one of the beam indicated by the first reference signal and the beam indicated by the second reference signal as the receive beam in the first transmission mechanism; or the terminal device may perform weighted combining on a spatial domain filter coefficient corresponding to the beam indicated by the first reference signal and a spatial domain filter coefficient corresponding to the beam indicated by the second reference signal, to obtain a new spatial domain filter coefficient as the receive beam. For example, when the network device configures a plurality of QCL-type D parameters for one CSI-RS resource, it may be agreed by using a protocol that the terminal device uses a common receive beam of reference signals associated with the plurality of QCL-type D parameters as a receive beam of the CSI-RS. Alternatively, in previous beam training, the terminal device has trained a receive beam that should be used when the first reference signal and the second reference signal that are associated with the plurality of QCL-type D parameters are simultaneously received, and the terminal device may directly use the receive beam.

In this embodiment, a plurality of sets of parameters are configured for one CSI-RS resource, so that in a scenario in which one network device serves a plurality of terminals by using both the single-station transmission mechanism and the CJT mechanism, there is no need to configure a plurality of sets of CSI-RS resources. This makes CSI-RS resource reuse in each cell more flexible and helps reduce overheads of configured CSI-RS resources and improve utilization of the CSI-RS resources.

In an optional embodiment, the method further includes: the terminal device transmits first indication information, and correspondingly, the network device receives the first indication information from the terminal device, where the first indication information is used to indicate data transmission mechanisms, and the data transmission mechanisms include a first transmission mechanism and a second transmission mechanism.

In an optional embodiment, the method further includes: the network device transmits first indication information to the terminal device, and correspondingly, the terminal device receives the first indication information from the network device.

The first transmission mechanism may be configured by the network device for the terminal device or may be reported by the terminal device to the network device.

In an optional embodiment, the method further includes: the terminal device transmits second indication information, and correspondingly, the network device receives the second indication information from the terminal device, where the second indication information is used to indicate the $K_2$ CSI-RS resources.

In an optional embodiment, the method further includes: the network device transmits second indication information to the terminal device, and correspondingly, the terminal device receives the second indication information from the network device.

In other words, the $K_2$ CSI-RS resources may be configured by the network device for the terminal device or may be reported by the terminal device to the network device. The network device may first configure the $K_1$ CSI-RS resources for the terminal device by using the first signaling. In a possible scenario, if quality of a channel between the terminal device and a base station in a plurality of base stations (or TRPs) that perform transmission by using the CJT mechanism changes, the network device may select the $K_2$ CSI-RS resources from the CSI-RS resources and indicate the $K_2$ CSI-RS resources to the terminal device. Alternatively, because the terminal device moves and cannot receive signals transmitted by some of the plurality of base stations any longer, the terminal device may select CSI-RS resources corresponding to base stations from which the terminal device can receive signals, that is, select the $K_2$ CSI-RS resources, and report the selected $K_2$ CSI-RS resources to the network device.

It should be understood that, sequence numbers of the foregoing processes do not mean execution sequences. The execution sequences of the processes should be determined according to functions and internal logic of the processes and should not be construed as any limitation on the implementation processes of embodiments.

Figure 2:
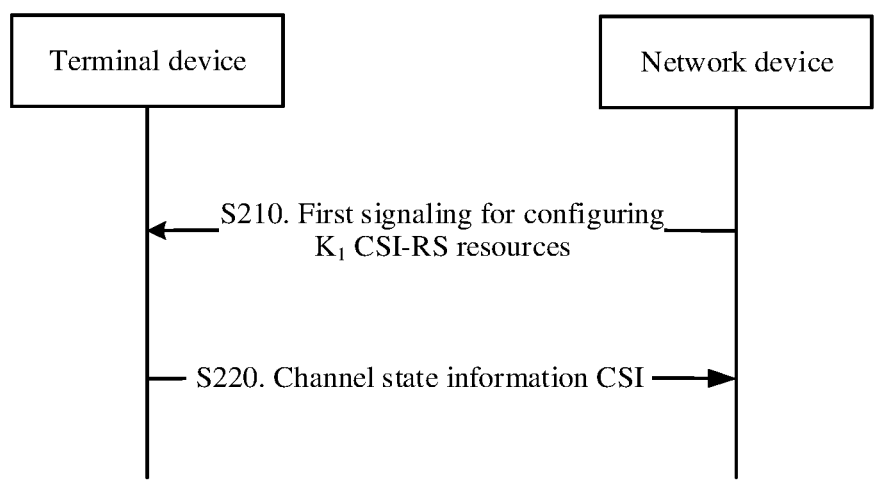
FIG. 2 is a schematic flowchart of a communication method according to an embodiment.

The communication method in the embodiments is described in detail above with reference to FIG. 1 to FIG. 3. The following describes in detail communications apparatuses according to embodiments with reference to FIG. 4 and FIG. 5.

FIG. 4 shows a communications apparatus 400 according to an embodiment. The apparatus 400 may be a terminal device, a chip in a terminal device, a network device, or a chip in a network device. The apparatus 400 may include a receiving unit 410 and a transmission unit 420.

In a possible implementation, the apparatus 400 is configured to perform procedures and steps corresponding to the terminal device in the foregoing method embodiment.

The receiving unit 410 is configured to receive first signaling, where the first signaling is used to configure $K_1$ channel state information-reference signal CSI-RS resources. The transmission unit 420 is configured to report channel state information CSI, where the CSI includes a channel quality indicator CQI of a first codeword, a channel measurement part used to calculate the CQI of the first codeword is determined based on channel measurement results of $K_2$ CSI-RS resources, and the $K_2$ CSI-RS resources are resources in the $K_1$ CSI-RS resources, where both $K_1$ and $K_2$ are positive integers, $K_1$ is greater than 1, and $K_2$ is greater than 1 and less than or equal to $K_1$.

Optionally, the CQI of the first codeword is determined conditionally based on a precoding matrix indicator PMI, and a quantity of rows of a precoding matrix indicated by the PMI is equal to a sum of all or some port quantities of the $K_2$ CSI-RS resources.

Optionally, the CSI is determined based on a channel measurement result of a $k^{th}$ CSI-RS resource in the $K_2$ CSI-RS resources and a $k^{th}$ first parameter, where the $k^{th}$ first parameter is determined based on a matrix part corresponding to a port of the $k^{th}$ CSI-RS resource in the precoding matrix and a reference precoding matrix, k=1, 2, . . . , $K_2$, and the reference precoding matrix is a matrix part corresponding to a port of one of the $K_1$ CSI-RS resources in the precoding matrix.

Optionally, the CSI is determined based on the following information: the channel measurement result of the $k^{th}$ CSI-RS resource, the $k^{th}$ first parameter, and a second parameter of the $k^{th}$ CSI-RS resource, where the second parameter of the $k^{th}$ CSI-RS resource is determined based on a physical downlink shared channel PDSCH and the $k^{th}$ CSI-RS resource.

Optionally, the first parameter is configured by a network device for the apparatus by using second signaling; or the first parameter is determined by the apparatus, and the CSI includes the first parameter.

Optionally, the CSI is determined based on a first transmission mechanism, a channel measurement result of a $k^{th}$ CSI-RS resource in the $K_2$ CSI-RS resources, and a third parameter of the $k^{th}$ CSI-RS resource; and the receiving unit 410 is further configured to: receive third signaling, where the third signaling is used to configure the third parameter of the $k^{th}$ CSI-RS resource in the $K_2$ CSI-RS resources, and the third parameter is determined based on EPRE of a PDSCH and EPRE of the $k^{th}$ CSI-RS resource in the first transmission mechanism; and receive fourth signaling, where the fourth signaling is used to configure a fourth parameter of the $k^{th}$ CSI-RS resource, and the fourth parameter is determined based on EPRE of a PDSCH and EPRE of the $k^{th}$ CSI-RS resource in a second transmission mechanism, where k=1, 2, . . . , $K_2$.

Optionally, an interference measurement part of the CQI of the first codeword is determined based on interference measurement results of $K_3$ interference measurement resources IMRs, where $K_3$ is a positive integer.

Optionally, the interference measurement part of the CQI of the first codeword is determined based on measurement results of $K_4$ CSI-RS resources other than the $K_2$ CSI-RS resources in the $K_1$ CSI-RS resources, where $K_4$ is less than or equal to a difference between $K_1$ and $K_2$, the interference measurement part is determined based on summation of interference information measured on the $K_4$ CSI-RS resources, and interference information measured on a $j^{th}$ CSI-RS resource in the $K_4$ CSI-RS resources is determined based on an interference measurement result of the $j^{th}$ CSI-RS resource, where j=1, 2, . . . , $K_4$.

Optionally, a first quasi-co-location QCL-type D parameter and a second QCL-type D parameter are configured for one of the $K_2$ CSI-RS resources; the first QCL-type D parameter is associated with a first reference signal, and the second QCL-type D parameter is associated with a second reference signal; and the first reference signal is used to indicate the apparatus to receive a receive beam of the CSI-RS in the first transmission mechanism, and the second reference signal is used to indicate the apparatus to receive a receive beam of the CSI-RS in the second transmission mechanism; or the first reference signal and the second reference signal are used to indicate the apparatus to receive a receive beam of the CSI-RS in the first transmission mechanism.

Optionally, the transmission unit 420 is further configured to transmit first indication information, where the first indication information is used to indicate data transmission mechanisms, and the data transmission mechanisms include a first transmission mechanism and a second transmission mechanism; or the receiving unit 410 is further configured to receive first indication information from the network device.

Optionally, the transmission unit 420 is further configured to transmit second indication information, where the second indication information is used to indicate the $K_2$ CSI-RS resources; or the receiving unit 410 is further configured to receive second indication information from the network device.

In another possible implementation, the apparatus 400 is configured to perform procedures and steps corresponding to the network device in the foregoing method embodiment.

The transmission unit 420 is configured to transmit first signaling to a terminal device, where the first signaling is used to configure $K_1$ channel state information-reference signal CSI-RS resources. The receiving unit 410 is configured to receive channel state information CSI from the terminal device, where the CSI includes a channel quality indicator CQI of a first codeword, a channel measurement part used to calculate the CQI of the first codeword is determined based on channel measurement results of $K_2$ CSI-RS resources, and the $K_2$ CSI-RS resources are resources in the $K_1$ CSI-RS resources, where both $K_1$ and $K_2$ are positive integers, $K_1$ is greater than 1, and $K_2$ is greater than 1 and less than or equal to $K_1$.

Optionally, the CQI of the first codeword is determined conditionally based on a precoding matrix indicator PMI, and a quantity of rows of a precoding matrix indicated by the PMI is equal to a sum of all or some port quantities of the $K_2$ CSI-RS resources.

Optionally, the CSI is determined based on a channel measurement result of a $k^{th}$ CSI-RS resource in the $K_2$ CSI-RS resources and a $k^{th}$ first parameter, where the $k^{th}$ first parameter is determined based on a matrix part corresponding to a port of the $k^{th}$ CSI-RS resource in the precoding matrix and a reference precoding matrix, $k=1, 2, \ldots, K_2$, and the reference precoding matrix is a matrix part corresponding to a port of one of the $K_1$ CSI-RS resources in the precoding matrix.

Optionally, the CSI is determined based on the following information: the channel measurement result of the $k^{th}$ CSI-RS resource, the $k^{th}$ first parameter, and a second parameter of the $k^{th}$ CSI-RS resource, where the second parameter of the $k^{th}$ CSI-RS resource is determined based on a physical downlink shared channel PDSCH and the $k^{th}$ CSI-RS resource.

Optionally, the first parameter is configured by the apparatus for the terminal device by using second signaling; or the first parameter is reported by the terminal device, and the CSI includes the first parameter.

Optionally, the CSI is determined based on a first transmission mechanism, a channel measurement result of a $k^{th}$ CSI-RS resource in the $K_2$ CSI-RS resources, and a third parameter of the $k^{th}$ CSI-RS resource; and the transmission unit 420 is further configured to: transmit third signaling to the terminal device, where the third signaling is used to configure the third parameter of the $k^{th}$ CSI-RS resource in the $K_2$ CSI-RS resources, and the third parameter is determined based on EPRE of a PDSCH and EPRE of the $k^{th}$ CSI-RS resource in the first transmission mechanism; and transmit fourth signaling to the terminal device, where the fourth signaling is used to configure a fourth parameter of the $k^{th}$ CSI-RS resource, and the fourth parameter is determined based on EPRE of a PDSCH and EPRE of the $k^{th}$ CSI-RS resource in a second transmission mechanism, where $k=1, 2, \ldots, K_2$.

Optionally, an interference measurement part of the CQI of the first codeword is determined based on interference measurement results of $K_3$ interference measurement resources IMRs, where $K_3$ is a positive integer.

Optionally, the interference measurement part of the CQI of the first codeword is determined based on measurement results of $K_4$ CSI-RS resources other than the $K_2$ CSI-RS resources in the $K_1$ CSI-RS resources, where $K_4$ is less than or equal to a difference between $K_1$ and $K_2$, the interference measurement part is determined based on summation of interference information measured on the $K_4$ CSI-RS resources, and interference information measured on a $j^{th}$ CSI-RS resource in the $K_4$ CSI-RS resources is determined based on an interference measurement result of the $j^{th}$ CSI-RS resource, where $j=1, 2, \ldots, K_4$.

Optionally, a first quasi-co-location QCL-type D parameter and a second QCL-type D parameter are configured for one of the $K_2$ CSI-RS resources; the first QCL-type D parameter is associated with a first reference signal, and the second QCL-type D parameter is associated with a second reference signal; and the first reference signal is used to indicate the terminal device to receive a receive beam of the CSI-RS in the first transmission mechanism, and the second reference signal is used to indicate the terminal device to receive a receive beam of the CSI-RS in the second transmission mechanism; or the first reference signal and the second reference signal are used to indicate the terminal device to receive a receive beam of the CSI-RS in the first transmission mechanism.

Optionally, the transmission unit 420 is further configured to transmit first indication information to the terminal device, where the first indication information is used to indicate data transmission mechanisms, and the data transmission mechanisms include a first transmission mechanism and a second transmission mechanism; or the receiving unit 410 is further configured to receive first indication information from the terminal device.

Optionally, the transmission unit 420 is further configured to second indication information to the terminal device, where the second indication information is used to indicate the $K_2$ CSI-RS resources; or the receiving unit 410 is further configured to receive second indication information from the terminal device.

It should be understood that the apparatus 400 herein is embodied in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 400 may be the terminal device or the network device in the foregoing embodiment and that the apparatus 400 may be configured to perform procedures and/or steps corresponding to the terminal device or the network device in the foregoing method embodiment. To avoid repetition, details are not described herein again.

The apparatus 400 in each of the foregoing solutions has functions for implementing corresponding steps performed by the terminal device or the network device in the foregoing method. The functions may be implemented by hardware or may be implemented by corresponding software executed by hardware. The hardware or the software includes one or more modules corresponding to the functions. For example, the receiving unit 410 may be configured to perform steps and/or procedures of the receiving actions, and the transmission unit 420 may be configured to perform steps and/or procedures of the transmitting actions. The transmission unit 420 may be replaced with a transmitter, and the receiving unit 410 may be replaced with a receiver. The transmitter and the receiver respectively perform transmitting and receiving operations and related processing operations in each method embodiment.

In this embodiment, the apparatus 400 in FIG. 4 may alternatively be a chip or a chip system, for example, a system on chip (SoC). Correspondingly, the receiving unit and the transmission unit may be a transceiver circuit of the chip. This is not limited herein.

Figure 5:
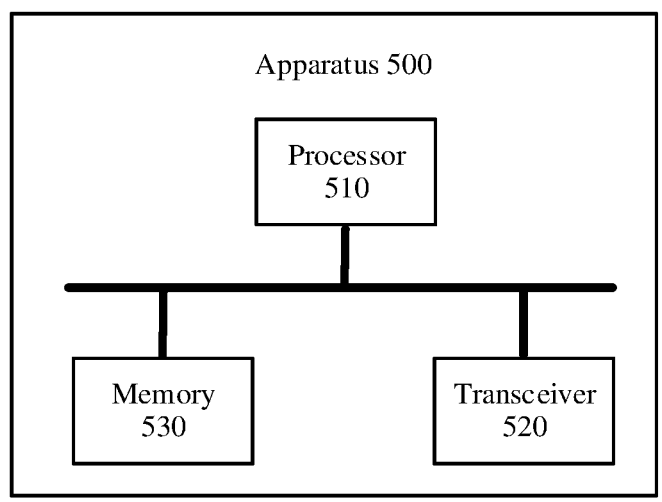
FIG. 5 is a schematic block diagram of another communications apparatus according to an embodiment.

FIG. 5 shows another communications apparatus 500 according to an embodiment. The apparatus 500 includes a processor 510, a transceiver 520, and a memory 530. The processor 510, the transceiver 520, and the memory 530 communicate with each other by using an internal connection path. The memory 530 is configured to store instructions. The processor 510 is configured to execute the instructions stored in the memory 530, to control the transceiver 520 to transmit a signal and/or receive a signal.

In a possible implementation, the apparatus 500 is configured to perform procedures and steps corresponding to the terminal device in the foregoing method 200.

The transceiver 520 is configured to receive first signaling, where the first signaling is used to configure $K_1$ channel state information-reference signal CSI-RS resources; and report channel state information CSI, where the CSI includes a channel quality indicator CQI of a first codeword, a channel measurement part used to calculate the CQI of the first codeword is determined based on channel measurement results of $K_2$ CSI-RS resources, and the $K_2$ CSI-RS resources are resources in the $K_1$ CSI-RS resources, where both $K_1$ and $K_2$ are positive integers, $K_1$ is greater than 1, and $K_2$ is greater than 1 and less than or equal to $K_1$.

In another possible implementation, the apparatus 500 is configured to perform procedures and steps corresponding to the network device in the foregoing method 200.

The transceiver 520 is configured to transmit first signaling to a terminal device, where the first signaling is used to configure $K_1$ channel state information-reference signal CSI-RS resources; and receive channel state information CSI from the terminal device, where the CSI includes a channel quality indicator CQI of a first codeword, a channel measurement part used to calculate the CQI of the first codeword is determined based on channel measurement results of $K_2$ CSI-RS resources, and the $K_2$ CSI-RS resources are resources in the $K_1$ CSI-RS resources, where both $K_1$ and $K_2$ are positive integers, $K_1$ is greater than 1, and $K_2$ is greater than 1 and less than or equal to $K_1$.

It should be understood that the apparatus 500 may be the terminal device or the network device in the foregoing embodiment and may be configured to perform steps and/or procedures corresponding to the terminal device or the network device in the foregoing method embodiment.

Optionally, the memory 530 includes a read-only memory and a random access memory and provide instructions and data to the processor. A part of the memory may further include a non-volatile random access memory. For example, the memory may further store information about a device type. The processor 510 may be configured to execute the instructions stored in the memory. When the processor 510 executes the instructions stored in the memory, the processor 510 is configured to perform steps and/or procedures in the method embodiment corresponding to the terminal device or the network device. The transceiver 520 may include a transmitter and a receiver. The transmitter may be configured to implement steps and/or procedures corresponding to the transceiver and used to perform transmitting actions, and the receiver may be configured to implement steps and/or procedures corresponding to the transceiver and used to perform receiving actions.

It should be understood that in embodiment, the processor of the foregoing apparatus may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

In an implementation process, the steps in the foregoing methods can be implemented by using a hardware integrated logic circuit in the processor, or by using instructions in a form of software. The steps of the method with reference to the embodiments may be directly performed by a hardware processor or may be performed by a combination of hardware and software units in the processor. A software unit may be located in a mature non-transitory storage medium in the art, such as a random access memory, a flash memory, a read-only memory, a programmable read-only memory, an electrically erasable programmable memory, a register, or the like. The non-transitory storage medium is located in the memory, and the processor reads instructions in the memory and completes the steps in the foregoing methods in combination with hardware of the processor. To avoid repetition, details are not described herein again.

A person of ordinary skill in the art may be aware that, in combination with the method steps and units described in the embodiments, the embodiments may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications. A person of ordinary skill in the art may use different methods to implement the described functions for each particular application, but it should not be considered that the implementation goes beyond the scope of the embodiments.

An embodiment may further provide a communications system. The communications system may include the terminal device (the apparatus 400 or the apparatus 500 is embodied as the terminal device) shown in FIG. 4 or FIG. 5 and the network device (the apparatus 400 or the apparatus 500 is embodied as the network device) shown in FIG. 4 or FIG. 5.

It may be clearly understood by a person skilled in the art that, for convenience and brevity of description, for a working process of the foregoing system, apparatus, and unit, refer to a corresponding process in the method embodiment. Details are not described herein again.

In several embodiments, it should be understood that the system, apparatus, and method may be implemented in another manner. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the embodiments.

In addition, functional units in the embodiments may be integrated into one processing unit, each of the units may exist alone physically, or two or more units may be integrated into one unit. The integrated unit may be implemented in a form of hardware or may be implemented in a form of a software functional unit.

When the foregoing integrated unit is implemented in the form of a software functional unit and sold or used as an independent product, the integrated unit may be stored in a computer-readable storage medium. Based on such an understanding, the embodiments may be implemented in a form of a software product. The computer software product is stored in a non-transitory storage medium and includes several instructions for instructing a computer device (which may be a personal computer, a server, a network device, or the like) to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely embodiments, but are not intended as limiting. Any modification or replacement readily figured out by a person skilled in the art shall fall within the scope of the embodiments.

What is claimed is:

1. A communication method, comprising:
   receiving, by a terminal device, first signaling, wherein the first signaling is used to configure $K_1$ channel state information-reference signal CSI-RS resources; and
   reporting, by the terminal device, channel state information CSI, wherein the CSI comprises a channel quality indicator CQI of a first codeword, a channel measurement part used to calculate the CQI of the first codeword is determined based on channel measurement results of $K_2$ CSI-RS resources, and the $K_2$ CSI-RS resources are resources in the $K_1$ CSI-RS resources, wherein
   both $K_1$ and $K_2$ are positive integers, $K_1$ is greater than 1, and $K_2$ is greater than 1 and less than or equal to $K_1$;
   wherein the CQI of the first codeword is determined conditionally based on a precoding matrix indicator PMI, and a quantity of rows of a precoding matrix indicated by the PMI is equal to a sum of all or some port quantities of the $K_2$ CSI-RS resources; and
   wherein the CSI is determined based on a channel measurement result of a $k^{th}$ CSI-RS resource in the $K_2$ CSI-RS resources, a $k^{th}$ first parameter and a reference precoding matrix.

2. The communication method according to claim 1, wherein
   the $k^{th}$ first parameter is determined based on a matrix part corresponding to a port of the $k^{th}$ CSI-RS resource in the precoding matrix and the reference precoding matrix, k=1, 2, . . . , $K_2$, and the reference precoding matrix is a matrix part corresponding to a port of one of the $K_1$ CSI-RS resources in the precoding matrix.

3. The communication method according to claim 2, wherein the CSI is determined based on the following information:
   the channel measurement result of the $k^{th}$ CSI-RS resource, the $k^{th}$ first parameter, and a second parameter of the $k^{th}$ CSI-RS resource, wherein
   the second parameter of the $k^{th}$ CSI-RS resource is determined based on a physical downlink shared channel PDSCH and the $k^{th}$ CSI-RS resource.

4. The communication method according to claim 2, wherein the first parameter is configured by a network device for the terminal device by using second signaling; or
   the first parameter is reported by the terminal device, and the CSI comprises the first parameter.

5. A non-transitory computer-readable storage medium, configured to store a computer program, wherein the computer program comprises instructions used to perform the method according to claim 1.

6. A chip, comprising a processor and an interface, configured to: invoke a computer program stored in a memory, and run the computer program to perform the method according to claim 1.

7. A communication method, comprising:
   transmitting, by a network device, first signaling to a terminal device, wherein the first signaling is used to configure $K_1$ channel state information-reference signal CSI-RS resources; and
   receiving, by the network device, channel state information CSI from the terminal device, wherein the CSI comprises a channel quality indicator CQI of a first codeword, a channel measurement part used to calculate the CQI of the first codeword is determined based on channel measurement results of $K_2$ CSI-RS resources, and the $K_2$ CSI-RS resources are resources in the $K_1$ CSI-RS resources, wherein
   both $K_1$ and $K_2$ are positive integers, $K_1$ is greater than 1, and $K_2$ is greater than 1 and less than or equal to $K_1$;
   wherein the CQI of the first codeword is determined conditionally based on a precoding matrix indicator PMI, and a quantity of rows of a precoding matrix indicated by the PMI is equal to a sum of all or some port quantities of the $K_2$ CSI-RS resources; and
   wherein the CSI is determined based on a channel measurement result of a $k^{th}$ CSI-RS resource in the $K_2$ CSI-RS resources, a $k^{th}$ first parameter and a reference precoding matrix.

8. The communication method according to claim 7, wherein the kth first parameter is determined based on a matrix part corresponding to a port of the kth CSI-RS resource in the precoding matrix and the reference precoding matrix, and the reference precoding matrix is a matrix part corresponding to a port of one of the K1 CSI-RS resources in the precoding matrix.

9. A communications apparatus, comprising:
a receiver, configured to receive first signaling, wherein the first signaling is used to configure $K_1$ channel state information-reference signal CSI-RS resources; and
a transmitter, configured to report channel state information CSI, wherein the CSI comprises a channel quality indicator CQI of a first codeword, a channel measurement part used to calculate the CQI of the first codeword is determined based on channel measurement results of $K_2$ CSI-RS resources, and the $K_2$ CSI-RS resources are resources in the $K_1$ CSI-RS resources, wherein
both $K_1$ and $K_2$ are positive integers, $K_1$ is greater than 1, and $K_2$ is greater than 1 and less than or equal to $K_1$;
wherein the COI of the first codeword is determined conditionally based on a precoding matrix indicator PMI, and a quantity of rows of a precoding matrix indicated by the PMI is equal to a sum of all or some port quantities of the $K_2$ CSI-RS resources; and
wherein the CSI is determined based on a channel measurement result of a $k^{th}$ CSI-RS resource in the $K_2$ CSI-RS resources, a $k^{th}$ first parameter and a reference precoding matrix.

10. The communication apparatus according to claim 9, wherein
the $k^{th}$ first parameter is determined based on a matrix part corresponding to a port of the $k^{th}$ CSI-RS resource in the precoding matrix and the reference precoding matrix, k=1, 2, . . . , $K_2$, and the reference precoding matrix is a matrix part corresponding to a port of one of the $K_1$ CSI-RS resources in the precoding matrix.

11. The communication apparatus according to claim 10, wherein the CSI is determined based on the following information:
the channel measurement result of the $k^{th}$ CSI-RS resource, the $k^{th}$ first parameter, and a second parameter of the $k^{th}$ CSI-RS resource, wherein
the second parameter of the $k^{th}$ CSI-RS resource is determined based on a physical downlink shared channel PDSCH and the $k^{th}$ CSI-RS resource.

12. The communication apparatus according to claim 10, wherein the first parameter is configured by a network device for the apparatus by using second signaling; or
the first parameter is determined by the apparatus, and the CSI comprises the first parameter.

13. A communications apparatus, comprising:
a transmitter, configured to transmit first signaling to a terminal device, wherein the first signaling is used to configure $K_1$ channel state information-reference signal CSI-RS resources; and
a receiver, configured to receive channel state information CSI from the terminal device, wherein the CSI comprises a channel quality indicator CQI of a first codeword, a channel measurement part used to calculate the CQI of the first codeword is determined based on channel measurement results of $K_2$ CSI-RS resources, and the $K_2$ CSI-RS resources are resources in the $K_1$ CSI-RS resources, wherein
both $K_1$ and $K_2$ are positive integers, $K_1$ is greater than 1, and $K_2$ is greater than 1 and less than or equal to $K_1$;
wherein the COI of the first codeword is determined conditionally based on a precoding matrix indicator PMI, and a quantity of rows of a precoding matrix indicated by the PMI is equal to a sum of all or some port quantities of the $K_2$ CSI-RS resources; and
wherein the CSI is determined based on a channel measurement result of a $k^{th}$ CSI-RS resource in the $K_2$ CSI-RS resources, a $k^{th}$ first parameter and a reference precoding matrix.

14. The communication apparatus according to claim 13, wherein
the $k^{th}$ first parameter is determined based on a matrix part corresponding to a port of the $k^{th}$ CSI-RS resource in the precoding matrix and the reference precoding matrix, k=1, 2, . . . , $K_2$, and the reference precoding matrix is a matrix part corresponding to a port of one of the $K_1$ CSI-RS resources in the precoding matrix.

15. The communication apparatus according to claim 14, wherein the CSI is determined based on the following information:
the channel measurement result of the $k^{th}$ CSI-RS resource, the $k^{th}$ first parameter, and a second parameter of the $k^{th}$ CSI-RS resource, wherein
the second parameter of the $k^{th}$ CSI-RS resource is determined based on a physical downlink shared channel PDSCH and the $k^{th}$ CSI-RS resource.

16. The communication apparatus according to claim 14, wherein the first parameter is configured by the apparatus for the terminal device by using second signaling; or
the first parameter is reported by the terminal device, and the CSI comprises the first parameter.

* * * * *